United States Patent
Lee

(10) Patent No.: US 11,880,232 B2
(45) Date of Patent: Jan. 23, 2024

(54) HINGE STRUCTURE AND ELECTRONIC DEVICE INCLUDING THE SAME

(71) Applicant: SAMSUNG ELECTRONICS CO., LTD., Suwon-si (KR)

(72) Inventor: Giyun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/593,808

(22) PCT Filed: Sep. 17, 2021

(86) PCT No.: PCT/KR2021/012832
§ 371 (c)(1),
(2) Date: Sep. 24, 2021

(87) PCT Pub. No.: WO2022/065834
PCT Pub. Date: Mar. 31, 2022

(65) Prior Publication Data
US 2023/0367363 A1 Nov. 16, 2023

(30) Foreign Application Priority Data
Sep. 24, 2020 (KR) .................. 10-2020-0124239

(51) Int. Cl.
*G06F 1/16* (2006.01)
*H04M 1/02* (2006.01)
(Continued)

(52) U.S. Cl.
CPC ............... *G06F 1/16* (2013.01); *E05D 3/122* (2013.01); *E05D 3/18* (2013.01);
(Continued)

(58) Field of Classification Search
CPC .................... H04M 1/0214; H04M 1/026
See application file for complete search history.

(56) References Cited

U.S. PATENT DOCUMENTS 8,938,856 B1   1/2015   Shin et al.
9,027,205 B2   5/2015   Ahn et al.
(Continued)

FOREIGN PATENT DOCUMENTS

KR   20-0300865    12/2002
KR   10-2004-0068128   7/2004
(Continued)

OTHER PUBLICATIONS

Search Report dated Jan. 3, 2022 in counterpart International Patent Application No. PCT/KR2021/012832.

*Primary Examiner* — Mukundbhai G Patel
(74) *Attorney, Agent, or Firm* — Nixon & Vanderhye, P.C.

(57) ABSTRACT

An electronic device includes a housing including a first housing and a second housing, a display extending from the first housing to the second housing, and a hinge structure including a hinge connected to the first housing and the second housing.

The hinge structure includes: a fixed portion, a first rotary portion coupled to the fixed structure to be rotatable about a first axis of rotation and connected to the first housing, a second rotary portion coupled to the fixed portion to be rotatable about a second axis of rotation and connected to the second housing, the first axis of rotation and the second axis of rotation extending parallel to an axial direction, a first arm shaft rotatably coupled to the fixed portion and parallel to the axial direction, a second arm shaft rotatably coupled to the fixed portion and parallel to the axial direction, a first arm coupled to the first arm shaft and configured to rotate together with the first arm shaft and including a first arm cam formed around the first arm shaft, a second arm coupled to the second arm shaft and configured to rotate together with the second arm shaft and including a second arm cam formed around the second arm shaft, a first elastic member (Continued)

coupled to the first arm shaft and configured to apply an elastic force in the axial direction, a second elastic member coupled to the second arm shaft and configured to apply an elastic force in the axial direction.

15 Claims, 35 Drawing Sheets

(51) Int. Cl.
*F16C 11/04* (2006.01)
*E05D 3/18* (2006.01)
*E05D 3/12* (2006.01)

(52) U.S. Cl.
CPC ......... *E05Y 2900/606* (2013.01); *F16C 11/04* (2013.01); *H04M 1/026* (2013.01); *H04M 1/0214* (2013.01)

(56) References Cited

U.S. PATENT DOCUMENTS

| | | | |
|---|---|---|---|
| 10,480,225 B1* | 11/2019 | Hsu | ............................. E05D 3/12 |
| 10,761,572 B1* | 9/2020 | Siddiqui | ................ G06F 1/1681 |
| 2005/0061091 A1 | 3/2005 | Kato | |
| 2015/0013107 A1 | 1/2015 | Shin et al. | |
| 2020/0348732 A1* | 11/2020 | Kang | .................... G06F 1/1652 |
| 2021/0243908 A1 | 8/2021 | Park et al. | |

FOREIGN PATENT DOCUMENTS

| | | |
|---|---|---|
| KR | 10-2012-0049762 | 5/2012 |
| KR | 10-2013-0008948 | 1/2013 |
| KR | 10- 2015-0006633 | 1/2015 |
| KR | 1731375 | 4/2017 |
| KR | 10-2019-0067400 | 6/2019 |
| KR | 10-2019-0124110 | 11/2019 |

* cited by examiner

HINGE STRUCTURE AND ELECTRONIC DEVICE INCLUDING THE SAME

CROSS-REFERENCE TO RELATED APPLICATIONS

This application is a national stage of International Application No. PCT/KR2021/012832 designating the United States, filed on Sep. 17, 2021, in the Korean Intellectual Property Receiving Office and claiming priority to Korean Patent Application No. 10-2020-0124239, filed on Sep. 24, 2020, in the Korean Intellectual Property Office, the disclosures of which are incorporated by reference herein in their entireties.

BACKGROUND

Field

The disclosure relates to a hinge structure and an electronic device including the same.

Description of Related Art

A portable electronic device such as a smartphone may provide various functions, such as telephone call, video playback, Internet search, and the like, based on various types of applications. A user may want to use the aforementioned various functions through a wide screen. However, portability may be decreased with an increase in screen size. Accordingly, to provide a wide screen while ensuring portability, a foldable electronic device including a flexible display, a partial area of which is deformable to be curved or flat, is being developed. The foldable electronic device may include a hinge structure to which adjacent housings are rotatably connected.

The above information is presented as background information only to assist with an understanding of the disclosure. No determination has been made, and no assertion is made, as to whether any of the above might be applicable as prior art with regard to the disclosure.

The foldable electronic device may include the flexible display, at least a partial area of which is deformable to be curved or flat. When the size of the flexible display is increased, a restoring force (e.g., a force by which a curved area returns to a flat area) in a folded state may be increased. The restoring force may cause a defect in a folding motion and an unfolding motion of the foldable electronic device. For example, due to the restoring force of the display, the foldable electronic device may not be able to maintain a folded state desired by a user.

SUMMARY

Embodiments of the disclosure address at least the above-mentioned problems and/or disadvantages and to provide at least the advantages described below.

Embodiments of the disclosure provide a hinge structure for providing torque capable of cancelling out a restoring force of a display.

In accordance with an example embodiment of the disclosure, an electronic device includes: a housing including a first housing and a second housing, a display extending from the first housing to the second housing, and a hinge structure comprising a hinge connected to the first housing and the second housing. The hinge structure includes: a fixed portion, a first rotary portion coupled to the fixed structure to be rotatable about a first axis of rotation and connected to the first housing, a second rotary portion coupled to the fixed portion to be rotatable about a second axis of rotation and connected to the second housing, the first axis of rotation and the second axis of rotation extending parallel to an axial direction, a first arm shaft rotatably coupled to the fixed portion and parallel to the axial direction, a second arm shaft rotatably coupled to the fixed portion and parallel to the axial direction, a first arm coupled to the first arm shaft configured to rotate together with the first arm shaft and including a first arm cam formed around the first arm shaft, a second arm coupled to the second arm shaft configured to rotate together with the second arm shaft and including a second arm cam formed around the second arm shaft, a first elastic member coupled to the first arm shaft and configured to apply an elastic force in the axial direction, a second elastic member coupled to the second arm shaft and configured to apply an elastic force in the axial direction, a first moving cam coupled to the first arm shaft configured to linearly move in the axial direction and rotate about the axial direction, the first moving cam being supported by the first elastic member and located between the first elastic member and the first arm cam, a second moving cam coupled to the second arm shaft configured to linearly move in the axial direction and rotate about the axial direction, the second moving cam being supported by the second elastic member and located between the second elastic member and the second arm cam, and a cam coupled to the first arm shaft and the second arm shaft configured to linearly move in the axial direction. The cam including a first portion through which the first arm shaft passes and including a first cam engaged with the first arm cam and a second cam engaged with the first moving cam, a second portion through which the second arm shaft passes and including a third cam engaged with the second arm cam and a fourth cam engaged with the second moving cam, and a connecting portion connecting the first portion and the second portion.

In accordance with another example embodiment of the disclosure, a hinge structure included in a foldable electronic device includes: a first arm shaft extending in an axial direction, a first arm coupled to the first arm shaft and configured to rotate together with the first arm shaft including a first arm cam formed around the first arm shaft, a first moving cam coupled to the first arm shaft configured to rotate together with the first arm shaft and linearly move in the axial direction along the first arm shaft, a first elastic member coupled to the first arm shaft and configured to be compressed or uncompressed based on a movement of the first moving cam, a second arm shaft extending in the axial direction, a second arm coupled to the second arm shaft and configured to rotate together with the second arm shaft and including a second arm cam formed around the second arm shaft, a second moving cam coupled to the second arm shaft configured to rotate together with the second arm shaft and linearly move in the axial direction along the second arm shaft, a second elastic member coupled to the second arm shaft and configured to be compressed or uncompressed depending on a movement of the second moving cam, and a cam configured to linearly move in the axial direction along the first arm shaft and the second arm shaft, the cam including a first portion through which the first arm shaft passes, a second portion through which the second arm shaft passes, and a connecting portion connecting the first portion and the second portion. The first portion of the cam includes a first cam engaged with the first arm cam and a second cam engaged with the first moving cam, and the second portion of the cam includes a third cam engaged with the second arm cam and a fourth cam engaged with the second moving cam. First protruding portions of the first arm cam and the second arm cam are spaced apart from fourth protruding portions of the first moving cam and the second moving cam by a first angle. The cam is formed such that second protruding portions of the first cam and the third cam are spaced apart from third protruding portions of the second cam and the fourth cam by a second angle. The first angle is equal to the second angle.

Other aspects, advantages, and salient features of the disclosure will become apparent to those skilled in the art from the following detailed description, which, taken in conjunction with the annexed drawings, discloses various embodiments of the disclosure.

The electronic device according to various example embodiments of the disclosure may include the hinge structure that provides torque greater than or equal to the restoring force of the display. Accordingly, a folding motion of the foldable electronic device or a folded state desired by a user may be stably maintained.

Furthermore, the hinge structure according to various example embodiments of the disclosure may provide torque sufficient to cancel out the restoring force of the display without an increase in the thickness of the electronic device.

In addition, the disclosure may provide various effects that are directly or indirectly recognized.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

With regard to description of the drawings, identical or similar reference numerals may be used to refer to identical or similar components.

DETAILED DESCRIPTION

Hereinafter, various example embodiments of the disclosure may be described with reference to accompanying drawings. Accordingly, those of ordinary skill in the art will recognize that various modifications, equivalents, and/or alternatives on the various example embodiments described herein can be variously made without departing from the scope and spirit of the disclosure.

Figure 1:
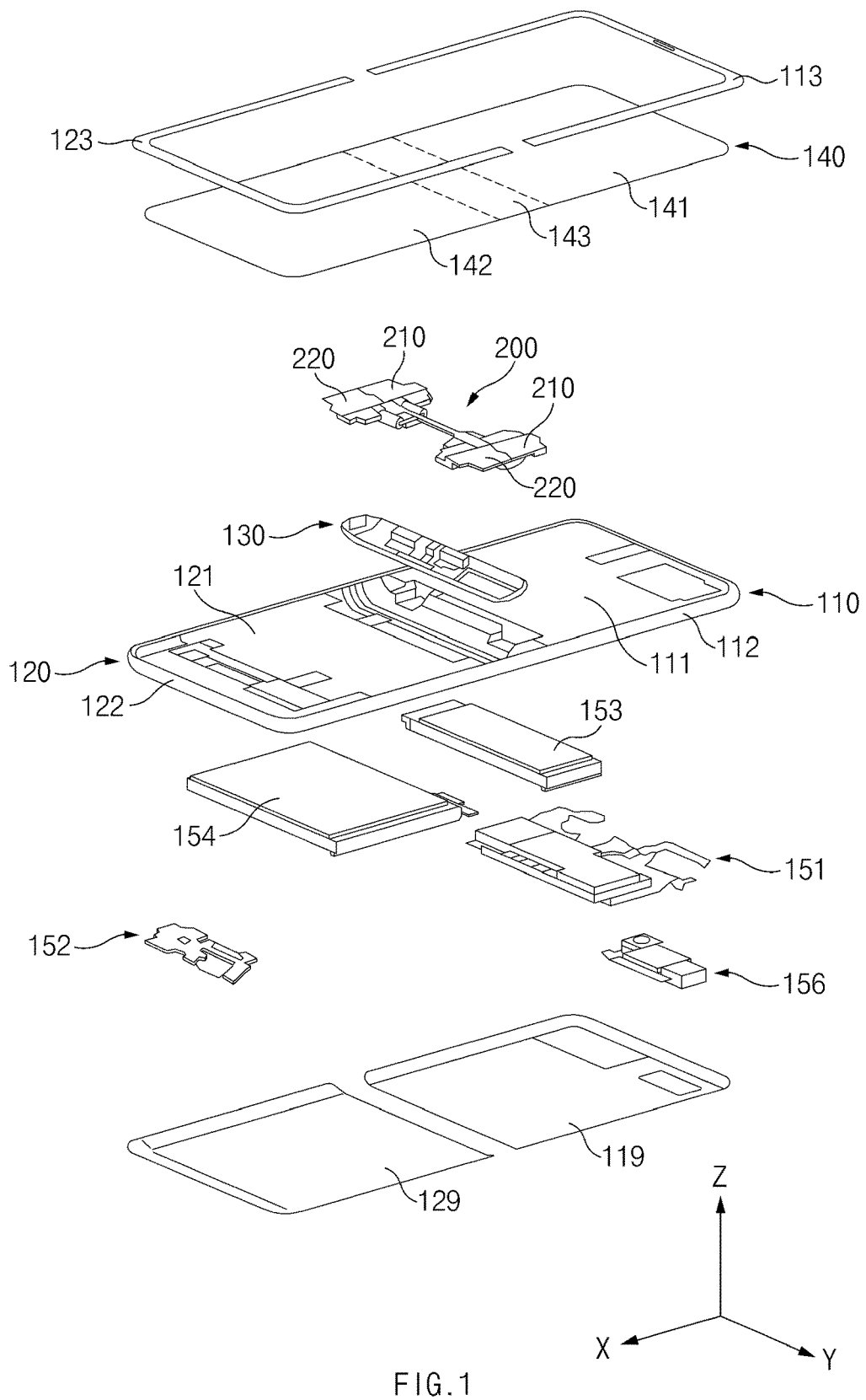
FIG. 1 is an exploded perspective view illustrating an example electronic device according to various embodiments.

FIG. 1 is an exploded perspective view illustrating an example electronic device according to various embodiments.

Referring to FIG. 1, the electronic device 100 may include a first housing 110, a second housing 120, a hinge housing 130, a hinge structure 200, and a display 140.

In an embodiment, the first housing 110 may be connected with the second housing 120 using the hinge structure 200. The first housing 110 may include a first plate 111 on which the display 140 is seated and a first frame 112 surrounding at least part of the first plate 111. For example, the first frame 112 may form a part of surfaces (e.g., side surfaces) of the electronic device 100. For example, at least part of a first area 141 of the display 140 and at least part of a folding area 143 of the display 140 may be disposed on the first plate 111. A first rotary structure 210 of the hinge structure 200 may be connected to the first plate 111. In an embodiment, at least part of the first housing 110 may be attached to the first area 141 of the display 140. Part of a periphery of a front surface of the first housing 110 may be attached to a periphery of the first area 141 of the display 140. In this regard, an adhesive layer may be disposed between the first plate 111 of the first housing 110 and the first area 141 of the display 140.

In an embodiment, at least part of the inside of the first housing 110 may be provided in a hollow form. The first housing 110 may have a first circuit board 151, a first battery 153, and a camera module 156 disposed therein. The first circuit board 151 and the first battery 153 may be electrically connected with a second circuit board 152 and a second battery 154 disposed in the second housing 120 through a flexible circuit board (e.g., a flexible circuit board 155 of FIG. 3). For example, a processor and a memory may be disposed on the first circuit board 151. For example, the first circuit board 151 and the first battery 153 may be disposed on the first plate 111. In an embodiment, at least part of the first housing 110 may be formed of a metallic material, or at least part of the first housing 110 may be formed of a non-metallic material. To support at least part of the display 140, the first housing 110 may be formed of a material having a predetermined rigidity. In an embodiment, a portion of the first housing 110 that faces the second housing 120 may include a depression, at least part of which has a predetermined curvature such that the hinge housing 130 is disposed therein.

In various embodiments, the first housing 110 may include a first decorative member (e.g. a frame) 113 surrounding a periphery of the display 140 and a first back cover 119 facing the first plate 111 and forming a surface of the electronic device 100. For example, the first decorative member 113 may be disposed to cover a peripheral portion of the first area 141 of the display 140 and a periphery of part of the folding area 143. For example, in an unfolded state (e.g., FIG. 2A), the first back cover 119 may form the rear side of the electronic device 100, and the display 140 may form the front side of the electronic device 100.

In an embodiment, the second housing 120 may be connected with the first housing 110 through the hinge structure 200. The second housing 120 may include a second plate 121 on which the display 140 is seated and a second frame 122 surrounding at least part of the second plate 121. For example, the second frame 122 may form a part of the surfaces (e.g., the side surfaces) of the electronic device 100. For example, at least part of a second area 142 of the display 140 and at least part of the folding area 143 of the display 140 may be disposed on the second plate 121. A second rotary structure 220 of the hinge structure 200 may be connected to the second plate 121. In an embodiment, at least part of the second housing 120 may be attached to the second area 142 of the display 140. Part of a periphery of a front surface of the second housing 120 may be attached to a periphery of the second area 142 of the display 140. In this regard, an adhesive layer may be disposed between the second plate 121 of the second housing 120 and the second area 142 of the display 140.

In an embodiment, at least part of the inside of the second housing 120 may be provided in a hollow form. The second housing 120 may have the second circuit board 152 and the second battery 154 disposed therein. The second circuit board 152 and the second battery 154 may be electrically connected with the first circuit board 151 and/or the first battery 153 disposed in the first housing 110 through the flexible circuit board (e.g., the flexible circuit board 155 of FIG. 3). For example, the second circuit board 152 and the second battery 154 may be disposed on the second plate 121. In an embodiment, at least part of the second housing 120 may be formed of a metallic material, or at least part of the second housing 120 may be formed of a non-metallic material. To support at least part of the display 140, the second housing 120 may be formed of a material having a predetermined rigidity. In an embodiment, a portion of the second housing 120 that faces the first housing 110 may include a depression, at least part of which has a predetermined curvature such that the hinge housing 130 is disposed therein.

In various embodiments, the second housing 120 may include a second decorative member (e.g., a frame) 123 surrounding a periphery of the display 140 and a second back cover 129 facing the second plate 121 and forming a surface of the electronic device 100. For example, the second decorative member 123 may be disposed to cover a peripheral portion of the second area 142 of the display 140 and a periphery of part of the folding area 143. For example, in the unfolded state (e.g., FIG. 2A), the second back cover 129 may form the rear side of the electronic device 100, and the display 140 may form the front side of the electronic device 100.

In various embodiments, the electronic device 100 may further include a lattice structure (not illustrated) and/or a bracket (not illustrated) disposed between the display 140 and the adhesive layers. The lattice structure may include a slit area including a plurality of slits at least partially overlapping the folding area 143. The plurality of slits may extend in an extension direction (e.g., the Y-axis direction) of the folding area 143. The plurality of slits may support the folding area 143 that is flat in the unfolded state (e.g., FIG. 2A) and may support deformation of the folding area 143 in a folding or unfolding motion. In various embodiments, only part of the lattice structure or the bracket may be stacked on the display 140.

In an embodiment, the hinge housing 130 may be disposed in the depression of the first housing 110 and the depression of the second housing 120. The hinge housing 130 may have a form extending in the Y-axis direction as a whole. Bosses for fixing the hinge structure 200 may be disposed on partial areas of an inner surface of the hinge housing 130.

In an embodiment, at least part of the display 140 may have flexibility. For example, the display 140 may include the first area 141 disposed on the first housing 110, the second area 142 disposed on the second housing 120, and the folding area 143 located between the first area 141 and the second area 142. In an embodiment, the first area 141 and the second area 142 may be flat, and the folding area 143 may be deformable to be flat or curved.

In various embodiments, the hinge structure 200 may include the first rotary structure 210 connected to the first housing 110 and the second rotary structure 220 connected to the second housing 120. The hinge structure 200 may be configured such that the first rotary structure 210 and the second rotary structure 220 are rotatable about axes of rotation thereof (e.g., virtual axes parallel to the Y-axis direction). For example, when the first housing 110 and the second housing 120 are folded or unfolded, the first rotary structure 210 and the second rotary structure 220 may rotate about the axes of rotation thereof.

Figure 2A:
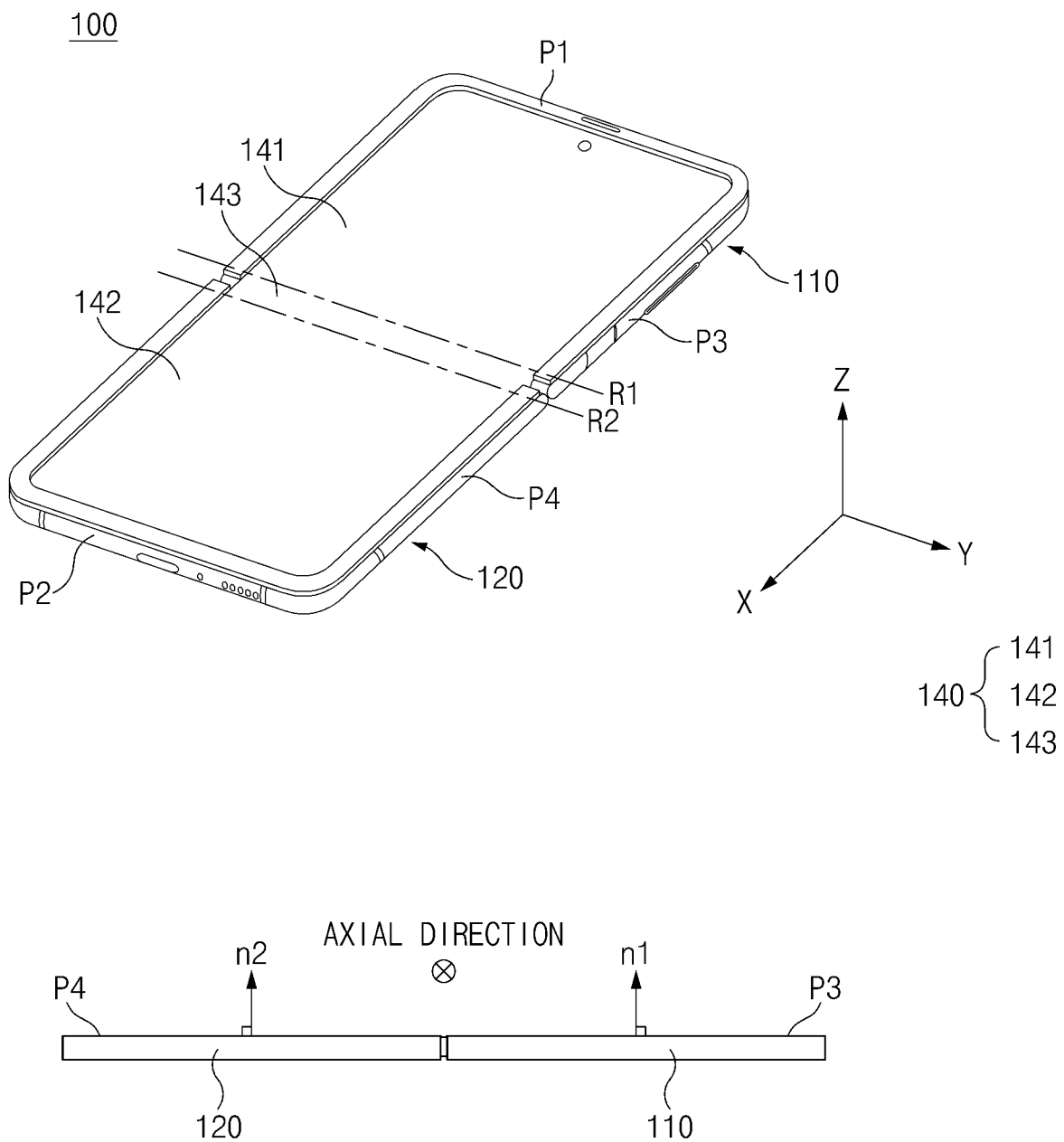
FIG. 2A is a perspective view illustrating the electronic device in an unfolded state according to various embodiments.
Figure 2B:
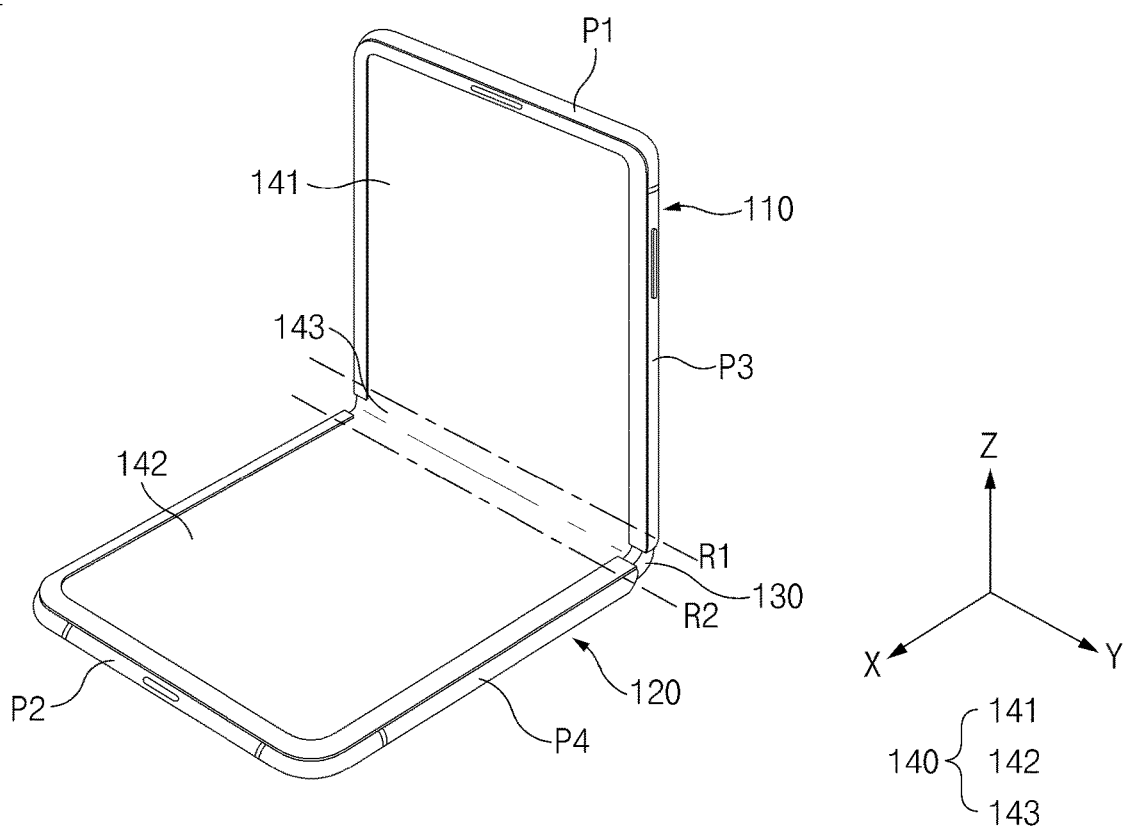
FIG. 2B is a perspective view illustrating the electronic device in a partially folded state according to various embodiments.
Figure 2B:
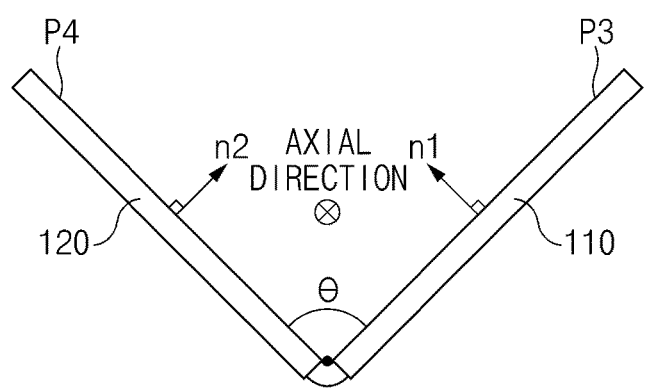
Figure 2C:
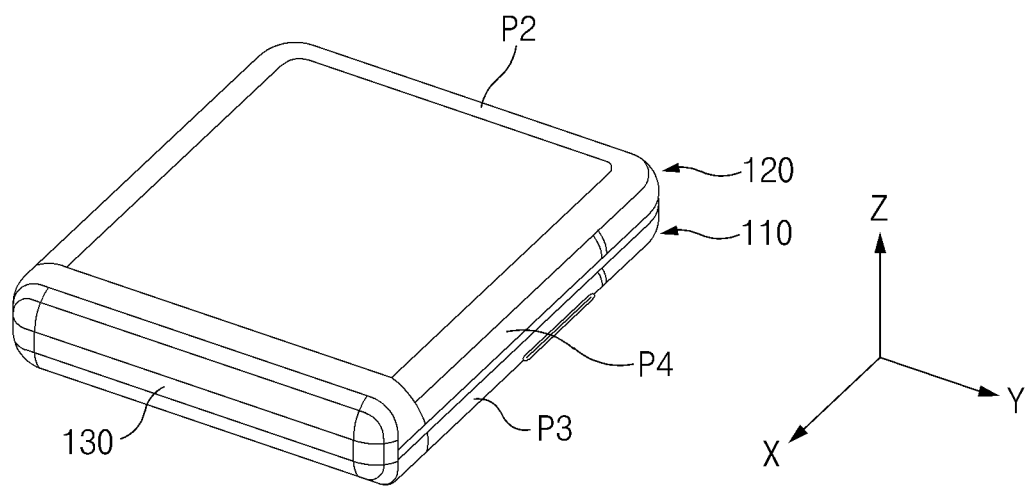
FIG. 2C is a perspective view illustrating the electronic device in a fully folded state according to various embodiments.
Figure 2C:
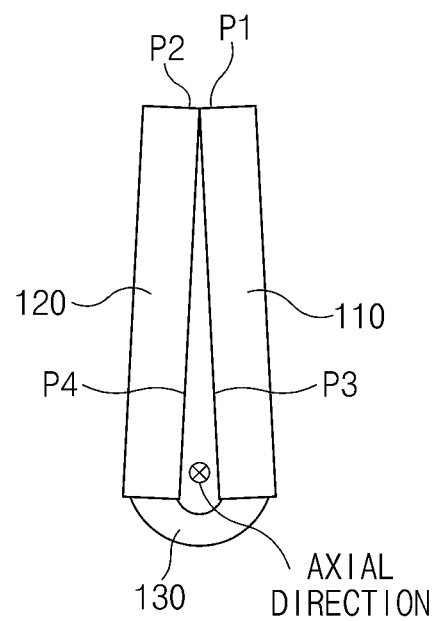

FIG. 2A is a perspective view illustrating the electronic device in a fully unfolded state according to various embodiments. FIG. 2B is a perspective view illustrating the electronic device in a partially folded state according to various embodiments. FIG. 2C is a perspective view illustrating the electronic device in a fully folded state according to various embodiments.

In an embodiment, the first housing 110 and the second housing 120 may rotate in opposite directions about the axes of rotation thereof, respectively. For example, in a folding motion performed in an unfolded state, the first housing 110 may rotate in the counterclockwise direction, and the second housing 120 may rotate in the clockwise direction.

In an embodiment, an axial direction parallel to the axes of rotation of the first housing 110 and the second housing 120 may be defined. The axial direction may be defined as the extension direction of the folding area 143 of the display 140. For example, the axial direction may be defined as the direction of long sides of the folding area 143. For example, the axial direction may refer to the direction parallel to the Y-axis of FIG. 1.

To describe a state of the electronic device 100 according to the embodiment of the disclosure, a first edge P1 of the electronic device 100 and a second edge P2 of the electronic device 100 that are parallel to the axial direction may be defined. To describe a state of the electronic device 100, a third edge P3 of the electronic device 100 and a fourth edge P4 of the electronic device 100 that are perpendicular to the axial direction may be defined. For example, the first edge P1 and the third edge P3 may include part of the first frame 112 of the first housing 110. For example, the second edge P2 and the fourth edge P4 may include part of the second frame 122 of the second housing 120.

A fully unfolded state of the electronic device 100 will be described below with reference to FIG. 2A.

For example, the unfolded state may include a state in which the folding area 143 of the display 140 is flat. For example, the unfolded state may include a state in which the first area 141 and the second area 142 of the display 140 face the same direction. For example, the unfolded state may include a state in which a first normal vector n1 of the first area 141 and a second normal vector n2 of the second area 142 of the display 140 are parallel to each other. For example, the unfolded state may include a state in which the third edge P3 and the fourth edge P4 form substantially one straight line. For example, the unfolded state may include a state in which the third edge P3 and the fourth edge P4 form an angle of 180 degrees.

A partially folded state of the electronic device 100 will be described below with reference to FIG. 2B.

For example, the partially folded state may include a state in which the folding area 143 of the display 140 is curved. For example, the partially folded state may include a state in which the first normal vector n1 of the first area 141 and the second normal vector n2 of the second area 142 form a certain angle rather than 180 degrees. For example, the folded state may include a state in which the third edge P3 and the fourth edge P4 form a predetermined angle rather than 180 degrees.

A fully folded state of the electronic device 100 will be described below with reference to FIG. 2C.

For example, the fully folded state may refer to the state in which the first edge P1 and the second edge P2 substantially make contact with each other, among folded states. For example, the folding area 143 in the fully folded state may be curved with a curvature greater than that of the folding area 143 in the folded state.

Referring to FIGS. 2B and 2C, in the folded state and the fully folded state, at least part of the hinge housing 130 may form a surface of the electronic device 100. For example, the hinge housing 130 may be visually exposed (e.g., visible) between the first housing 110 and the second housing 120.

Figure 3:
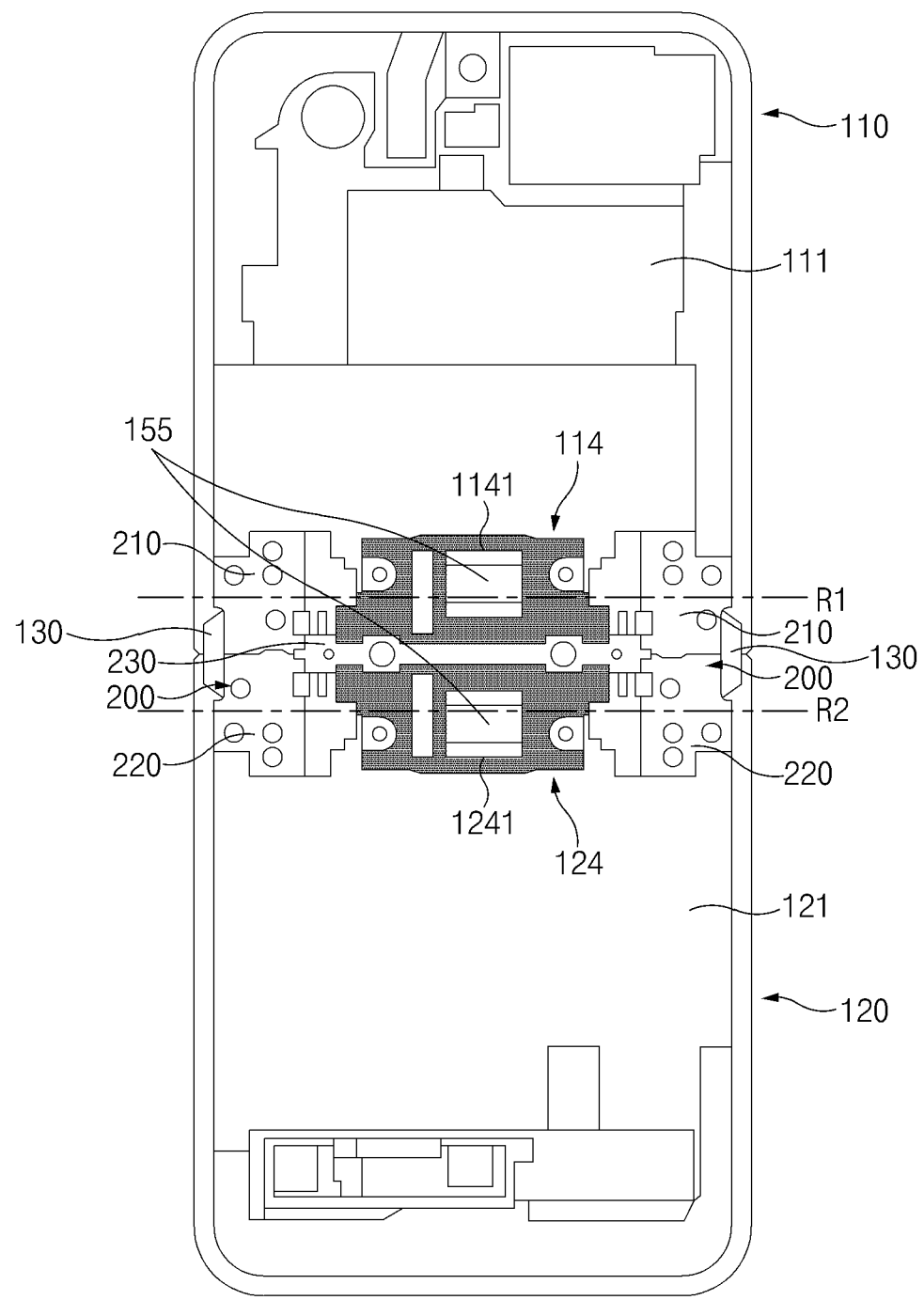
FIG. 3 is a diagram illustrating the electronic device according to various embodiments.

FIG. 3 is a diagram illustrating the electronic device according to various embodiments. FIG. 3 is a diagram in which the display is omitted from the electronic device illustrated in FIG. 1.

In an embodiment, the hinge structure 200 may include a fixed structure 230, the first rotary structure 210, and the second rotary structure 220.

In an embodiment, the fixed structure 230 may be fixedly disposed in the hinge housing 130. The first rotary structure 210 and the second rotary structure 220 may be rotatably coupled to the fixed structure 230. In an embodiment, the first rotary structure 210 may be coupled to the fixed structure 230 so as to be rotatable about a first axis of rotation R1. The first axis of rotation R1 may be parallel to a second axis of rotation R2. The first rotary structure 210 may be connected to the first plate 111 of the first housing 110. For example, when the electronic device 100 is folded or unfolded, the first rotary structure 210 may rotate about the first axis of rotation R1 together with the first housing 110. In an embodiment, the second rotary structure 220 may be coupled to the fixed structure 230 so as to be rotatable about the second axis of rotation R2. The second axis of rotation R2 may be parallel to the first axis of rotation R1. The second rotary structure 220 may be connected to the second plate 121 of the second housing 120. For example, when the electronic device 100 is folded or unfolded, the second rotary structure 220 may rotate about the second axis of rotation R2 together with the second housing 120.

In an embodiment, the electronic device 100 may include a first hinge plate 114, a second hinge plate 124, and the flexible circuit board 155.

In an embodiment, the first hinge plate 114 may be coupled to the first plate 111 of the first housing 110 and may extend such that at least part thereof covers part of the hinge housing 130. The first hinge plate 114 may be spaced apart from the second hinge plate 124 at a predetermined interval. The first hinge plate 114 may rotate together with the first housing 110 when the first housing 110 rotates about the first axis of rotation R1. For example, in a folded state (e.g., FIG. 2B or 2C), at least part of the first hinge plate 114 may be accommodated in the hinge housing 130.

In an embodiment, the second hinge plate 124 may be coupled to the second plate 121 of the second housing 120 and may extend such that at least part thereof covers part of the hinge housing 130. The second hinge plate 124 may be spaced apart from the first hinge plate 114 at the predetermined interval. The second hinge plate 124 may rotate together with the second housing 120 when the second housing 120 rotates about the second axis of rotation R2. For example, in a folded state (e.g., FIG. 2B or 2C), at least part of the second hinge plate 124 may be accommodated in the hinge housing 130.

In an embodiment, in a fully folded state (e.g., FIG. 2C), the first hinge plate 114 and the second hinge plate 124 may be disposed with a partial area (e.g., the folding area 143) of the display 140 therebetween. For example, in an unfolded state (e.g., FIG. 2A), the first hinge plate 114 and the second hinge plate 124 may be disposed substantially parallel to the display 140 so as to support a rear surface of the display 140.

In an embodiment, the flexible circuit board 155 may electrically connect electric elements disposed in the first housing 110 and electric elements disposed in the second housing 120. For example, the flexible circuit board 155 may connect a first circuit board (e.g., the first circuit board 151 of FIG. 1) and a second circuit board (e.g., the second circuit board 152 of FIG. 1). For example, the flexible circuit board 155 may connect a first battery (e.g., the first battery 153 of FIG. 1) and a second battery (e.g., the second battery 154 of FIG. 1). In an embodiment, the flexible circuit board 155 may extend such that a partial area thereof passes through a first opening area 1141 formed in the first hinge plate 114 and a second opening area 1241 formed in the second hinge plate 124. For example, as illustrated in FIG. 3, at least a partial area of the flexible circuit board 155 may be exposed through the first opening area 1141 and the second opening area 1241 when viewed from above. For example, at least a partial area of the flexible circuit board 155 may be located in the hinge housing 130. In an embodiment, a movement range of the flexible circuit board 155 in a folding motion and/or an unfolding motion may be limited by the first hinge plate 114 and the second hinge plate 124. Accordingly, the flexible circuit board 155 may be prevented from or may avoid colliding with, or being damaged by, other structures (e.g., the rotary structures 210 and 220) in the folding motion and/or the unfolding motion.

Figure 4:
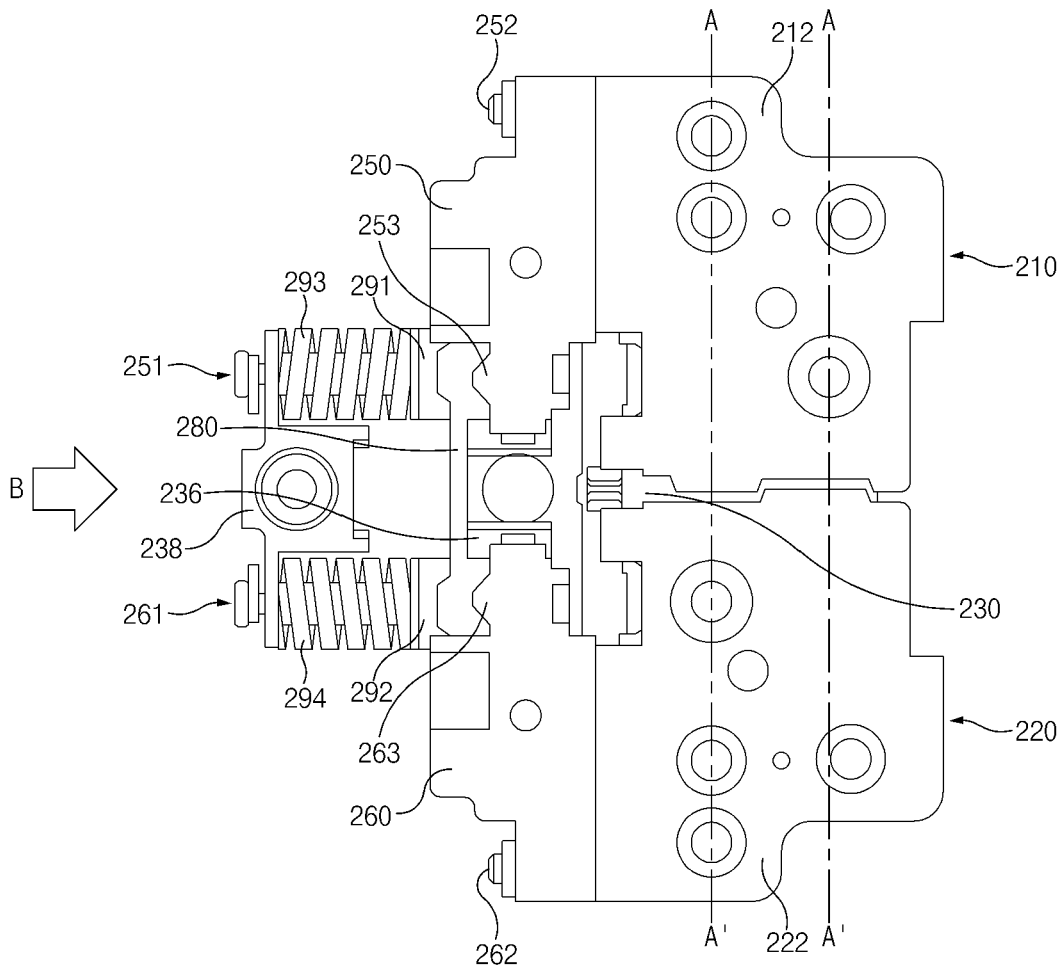
FIG. 4 is a diagram illustrating a hinge structure according to various embodiments.
Figure 5:
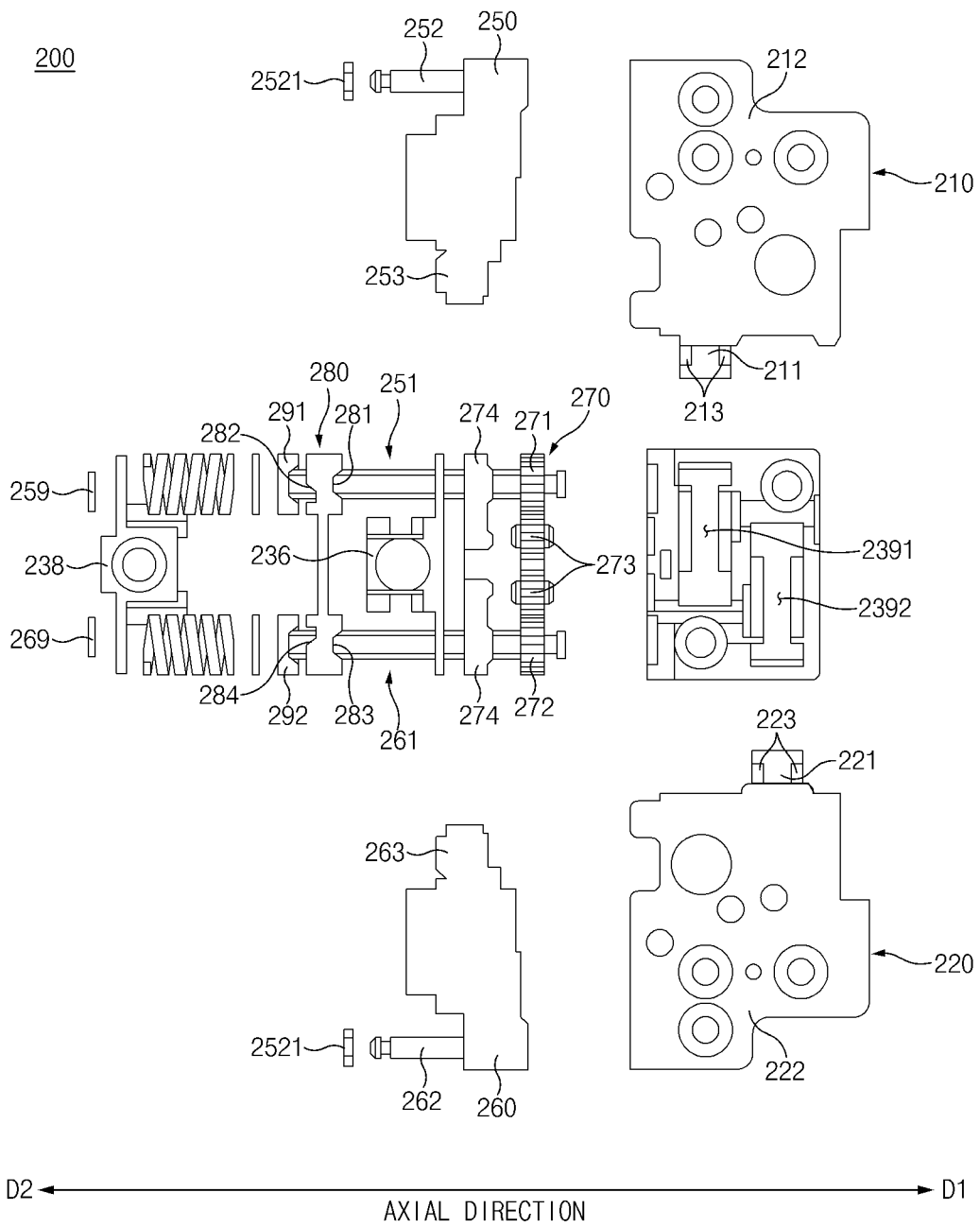
FIG. 5 is a diagram illustrating the hinge structure according to various embodiments.
Figure 6:
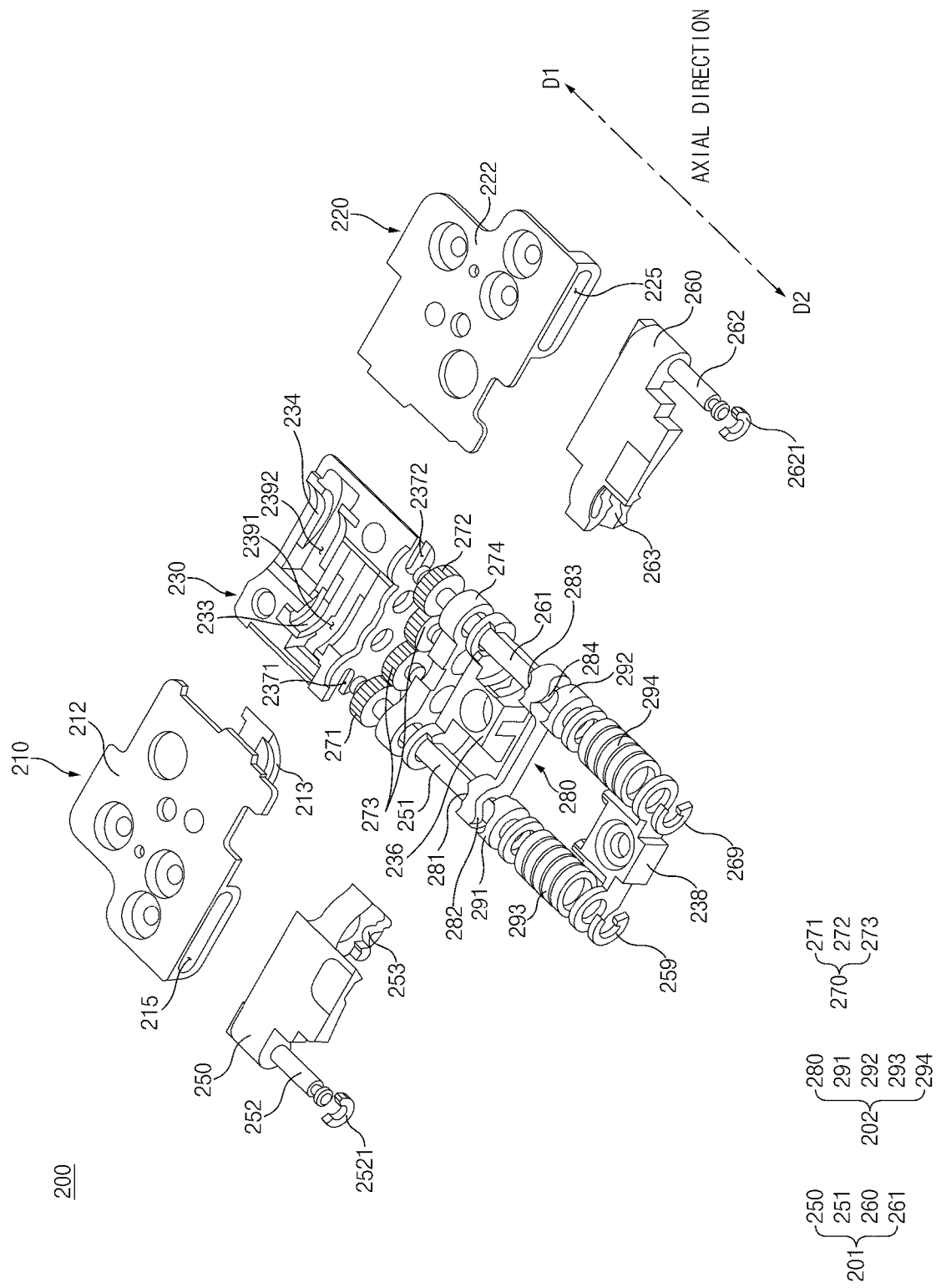
FIG. 6 is an exploded perspective view illustrating the hinge structure according to various embodiments.

FIG. 4 is a diagram illustrating the hinge structure according to various embodiments. FIG. 5 is a diagram illustrating the hinge structure according to various embodiments. FIG. 6 is an exploded perspective view illustrating the hinge structure according to various embodiments.

An axial direction may be defined in the hinge structure 200. The axial direction may be a direction parallel to the direction in which the first axis of rotation R1 and the second axis of rotation R2 extend. A first axial direction D1 may be a direction toward the fixed structure 230, and a second axial direction D2 may be a direction toward a fixing member 238.

In an embodiment, the hinge structure 200 may include the fixed structure 230, the first rotary structure 210, the second rotary structure 220, an arm structure 201, and a friction structure 202.

In an embodiment, at least part of the fixed structure 230 may be fixedly disposed in a hinge housing (e.g., the hinge housing 130 of FIG. 1). The first rotary structure 210 and the second rotary structure 220 may be rotatably coupled to the fixed structure 230.

In an embodiment, the fixed structure 230 may include a first opening area 2391 to which a first coupling portion 211 of the first rotary structure 210 is coupled. In an embodiment, the fixed structure 230 may include a first guide rail 233 for guiding a rotational path of the first rotary structure 210. For example, the first guide rail 233 may be formed on a sidewall of the first opening area 2391. For example, the first guide rail 233 may be formed on at least one of opposite sidewalls of the first opening area 2391 that face the axial direction. In an embodiment, a first guide portion 213 of the first rotary structure 210 may be accommodated in the first guide rail 233.

In an embodiment, the fixed structure 230 may include a second opening area 2392 to which a second coupling portion 221 of the second rotary structure 220 is coupled. In an embodiment, the fixed structure 230 may include a second guide rail 234 for guiding a rotational path of the second rotary structure 220. For example, the second guide rail 234 may be formed on a sidewall of the second opening area 2392. For example, the second guide rail 234 may be formed on at least one of opposite sidewalls of the second opening area 2392 that face the axial direction. In an embodiment, a second guide portion 223 of the second rotary structure 220 may be accommodated in the second guide rail 234.

In an embodiment, the first rotary structure 210 may rotate along a predetermined path relative to the fixed structure 230, which is fixedly disposed in the hinge housing, when a first housing (e.g., the first housing 110 of FIG. 1) is folded or unfolded. In an embodiment, the first rotary structure 210 may include the first coupling portion 211 rotatably coupled to the fixed structure 230 and a first extending portion 212 connected to the first housing 110. The first extending portion 212 may be folded or unfolded together with the first housing 110 when the electronic device 100 is folded or unfolded. In an embodiment, the first rotary structure 210 may include the first guide portion 213 formed on the first coupling portion 211. The first guide portion 213, together with the first guide rail 233, may guide the rotational path of the first rotary structure 210. In an embodiment, the first guide portion 213 may protrude from the first coupling portion 211 in the axial direction. For example, at least part of the first guide portion 213 may be accommodated in the first guide rail 233.

In an embodiment, the second rotary structure 220 may rotate along a predetermined path relative to the fixed structure 230, which is fixedly disposed in the hinge housing, when a second housing (e.g., the second housing 120 of FIG. 1) is folded or unfolded. In an embodiment, the second rotary structure 220 may include the second coupling portion 221 rotatably coupled to the fixed structure 230 and a second extending portion 222 connected to the second housing 120. The second extending portion 222 may be folded or unfolded together with the second housing 120 when the electronic device 100 is folded or unfolded. In an embodiment, the second rotary structure 220 may include the second guide portion 223 formed on the second coupling portion 221. The second guide portion 223, together with the second guide rail 234, may guide the rotational path of the second rotary structure 220. In an embodiment, the second guide portion 223 may protrude from the second coupling portion 221 in the axial direction. For example, at least part of the second guide portion 223 may be accommodated in the second guide rail 234.

In an embodiment, the arm structure 201 may include a first arm shaft 251, a second arm shaft 261, a first arm 250, a second arm 260, and a gear structure 270, the fixing member 238, and a stopper 236. In an embodiment, the arm structure 201 may link the first rotary structure 210 and the second rotary structure 220 such that the first rotary structure 210 and the second rotary structure 220 rotate in opposite directions by the same angle.

In an embodiment, the gear structure 270 may include a first gear 271 formed on an outer circumferential surface of the first arm shaft 251, a second gear 272 formed on an outer circumferential surface of the second arm shaft 261, and a connecting gear 273 connecting the first gear 271 and the second gear 272. The first arm shaft 251 and the second arm shaft 261 may be engaged with each other through the gear structure 270 to rotate in opposite directions by the same angle. For example, the connecting gear 273 may include an even number of gears. The gear structure 270 may further include a gear cover 274. The gear cover 274 may cover the first gear 271, the second gear 272, and the connecting gear 273. The gear cover 274 may be formed such that the first arm shaft 251 and the second arm shaft 261 pass through the gear cover 274.

In an embodiment, the stopper 236 may be fixedly disposed in the hinge housing (e.g., the hinge housing 130 of FIG. 1). The stopper 236 may limit the range of rotation of the first arm 250 and the second arm 260. For example, the stopper 236 may be located between the first arm 250 and the second arm 260.

In an embodiment, the fixing member 238 may be fixedly disposed in the hinge housing (e.g., the hinge housing 130 of FIG. 1). The fixing member 238 may be located on end portions of the first arm shaft 251 and the second arm shaft 261 that face the second axial direction D2. The fixing member 238 may support rotation of the first arm shaft 251 and the second arm shaft 261 together with the fixed structure 230. The fixing member 238 may axially support a first elastic member 293 and a second elastic member 294.

For example, when the elastic members 293 and 294 are pressed in the second axial direction D2, the fixing member 238 may support the elastic members 293 and 294 in the first axial direction D1, and thus the elastic members 293 and 294 may be compressed.

In an embodiment, the first arm 250 may be coupled to the first arm shaft 251 so as to be rotatable about the first arm shaft 251. In an embodiment, the first arm 250 may be coupled to slide relative to the first rotary structure 210. For example, the first arm 250 may include a first sliding pin 252 coupled to the first rotary structure 210. At least part of the first sliding pin 252 may be accommodated in a first sliding groove 215 of the first rotary structure 210. In an embodiment, the first sliding pin 252 may pass through the first arm 250. For example, a fixing ring 2521 may be coupled to an end portion of the first sliding pin 252. In an embodiment, when the first rotary structure 210 rotates about the first axis of rotation R1, the first arm 250 may rotate about the first arm shaft 251 while sliding relative to the first rotary structure 210. For example, the first arm 250 may slide in the state in which the first sliding pin 252 is accommodated in the first rotary structure 210.

In an embodiment, the first arm shaft 251 may be rotatably coupled to the fixed structure 230. For example, an end portion of the first arm shaft 251 that faces the first axial direction D1 may be rotatably inserted into a recess or opening 2371 formed in the fixed structure 230. A first fixing ring 259 may be coupled to an end portion of the first arm shaft 251 that faces the second axial direction D2. The first fixing ring 259 may prevent and/or reduce separation of the first arm shaft 251 from the fixing member 238. In an embodiment, the fixed structure 230, the stopper 236, the first arm 250, a cam member 280, a first moving cam 291, the first elastic member 293, the fixing member 238, and the first fixing ring 259 may be coupled to the first arm shaft 251 when viewed in the second axial direction D2.

In an embodiment, the second arm 260 may be coupled to the second arm shaft 261 so as to be rotatable about the second arm shaft 261. In an embodiment, the second arm 260 may be coupled to slide relative to the second rotary structure 220. For example, the second arm 260 may include a second sliding pin 262 coupled to the second rotary structure 220. At least part of the second sliding pin 262 may be accommodated in a second sliding groove 225 of the second rotary structure 220. In an embodiment, the second sliding pin 262 may pass through the second arm 260. For example, a fixing ring 2621 may be coupled to an end portion of the second sliding pin 262. In an embodiment, when the second rotary structure 220 rotates about the second axis of rotation R2, the second arm 260 may rotate about the second arm shaft 261 while sliding relative to the second rotary structure 220. For example, the second arm 260 may slide in the state in which the second sliding pin 262 is accommodated in the second rotary structure 220.

In an embodiment, the second arm shaft 261 may be rotatably coupled to the fixed structure 230. For example, an end portion of the second arm shaft 261 that faces the first axial direction D1 may be rotatably inserted into a recess or opening 2372 formed in the fixed structure 230. A second fixing ring 269 may be coupled to an end portion of the second arm shaft 261 that faces the second axial direction D2. The second fixing ring 269 may prevent and/or reduce separation of the second arm shaft 261 from the fixing member 238. In an embodiment, the fixed structure 230, the stopper 236, the second arm 260, the cam member 280, a second moving cam 292, the second elastic member 294, the fixing member 238, and the second fixing ring 269 may be coupled to the second arm shaft 261 when viewed in the second axial direction D2.

In an embodiment, the friction structure 202 may provide torque corresponding to a restoring force of the display 140. For example, in a folded state (e.g., FIG. 2B or 2C) in which a partial area of the display 140 is curved, the restoring force of the display 140 may act on the first rotary structure 210 and the second rotary structure 220. For example, the restoring force of the display 140 may be a force by which the display 140 returns to an unfolded state. For example, the restoring force of the display 140 may be proportional to the size of the display 140. Accordingly, the hinge structure 200 according to the embodiment may include the friction structure 202 for providing torque capable of cancelling out the restoring force.

In an embodiment, the structures coupled to the first arm shaft 251 and the second arm shaft 261 may be fixed or moved when the first arm shaft 251 and the second arm shaft 261 rotate. The moving structures may rotate together with the arm shafts 251 and 261 and/or may linearly move in the axial direction along the arm shafts 251 and 261.

When the first arm shaft 251 rotates, the first moving cam 291 may rotate together with the first arm shaft 251 and may linearly move in the axial direction along the first arm shaft 251. When the second arm shaft 261 rotates, the second moving cam 292 may rotate together with the second arm shaft 261 and may linearly move in the axial direction along the second arm shaft 261. For example, the positions of the first moving cam 291 and the second moving cam 292 in the axial direction may vary depending on rotation angles of the arm shafts 251 and 261.

When the first arm shaft 251 rotates, the first arm 250 may rotate together with the first arm shaft 251 and may not linearly move in the axial direction along the first arm shaft 251. When the second arm shaft 261 rotates, the second arm 260 may rotate together with the second arm shaft 261 and may not linearly move in the axial direction along the second arm shaft 261. For example, the first arm 250 and the second arm 260 may rotate at fixed positions when viewed in the axial direction.

When the first arm shaft 251 rotates, the first fixing ring 259 may not linearly move in the axial direction along the first arm shaft 251 and may or may not rotate together with the first arm shaft 251. When the second arm shaft 261 rotates, the second fixing ring 259 may not linearly move in the axial direction along the second arm shaft 261 and may or may not rotate together with the second arm shaft 261.

When the first arm shaft 251 and the second arm shaft 261 rotate, the cam member 280 may not rotate and may linearly move in the axial direction along the first arm shaft 251 and the second arm shaft 261. When the first arm shaft 251 rotates, the first elastic member 293 may be compressed or uncompressed. When the second arm shaft 261 rotates, the second elastic member 294 may be compressed or uncompressed.

In an embodiment, the friction structure 202 may include a first arm cam 253, a second arm cam 263, the cam member 280, the first moving cam 291, the second moving cam 292, the first elastic member 293, and the second elastic member 294.

In an embodiment, the first arm cam 253 may be formed on the first arm 250. For example, the first arm cam 253 may be formed around the first arm shaft 251. The first arm cam 253 may be engaged with a first cam 281 of the cam member 280.

In an embodiment, the second arm cam 263 may be formed on the second arm 260. For example, the second arm cam 263 may be formed around the second arm shaft 261. The second arm cam 263 may be engaged with a third cam 283 of the cam member 280.

In an embodiment, the cam member 280 may include a first portion 280a through which the first arm shaft 251 passes, a second portion 280b through which the second arm shaft 261 passes, and a connecting portion 280c connecting the first portion 280a and the second portion 280b. In an embodiment, when the arm shafts 251 and 261 rotate, the cam member 280 may move in the axial direction without rotating.

In an embodiment, the cam member 280 may be disposed between the arms 250 and 260 and the moving cams 291 and 292 and may make contact with the arms 250 and 260 and the moving cams 291 and 292. The cam member 280 may include the first cam 281 and the third cam 283 that face the first axial direction D1, and a second cam 282 and a fourth cam 284 that face the second axial direction D2. In an embodiment, the first portion 280a may include the first cam 281 engaged with the first arm cam 253 and the second cam 282 engaged with the first moving cam 291. In an embodiment, the second portion 280b may include the third cam 283 engaged with the second arm cam 263 and the fourth cam 284 engaged with the second moving cam 292.

In an embodiment, the first moving cam 291 may be coupled to the first arm shaft 251. The first moving cam 291 may be engaged with the second cam 282 of the cam member 280. For example, the first moving cam 291 may rotate together with the first arm shaft 251 and may linearly move along the first arm shaft 251. The first moving cam 291 may compress the first elastic member 293, or may be pressed in the first axial direction D1 by the elastic force of the first elastic member 293. For example, the first moving cam 291 may compress the first elastic member 293 when the cam member 280 moves in the second axial direction D2. For example, the first moving cam 291 may be moved in the first axial direction D1 by the elastic force of the first elastic member 293 when the cam member 280 moves in the first axial direction D1.

In an embodiment, the second moving cam 292 may be coupled to the second arm shaft 261. The second moving cam 292 may be engaged with the fourth cam 284 of the cam member 280. For example, the second moving cam 292 may rotate together with the second arm shaft 261 and may linearly move along the second arm shaft 261. The second moving cam 292 may compress the second elastic member 293, or may be pressed in the first axial direction D1 by the elastic force of the second elastic member 294. For example, the second moving cam 292 may compress the second elastic member 294 when the cam member 280 moves in the second axial direction D2. For example, the second moving cam 292 may be moved in the first axial direction D1 by the elastic force of the second elastic member 294 when the cam member 280 moves in the first axial direction D1.

In an embodiment, the first elastic member 293 may be disposed between the first moving cam 291 and the fixing member 238. The first elastic member 293 may include a coil spring mounted on the first arm shaft 251. The first elastic member 293 may be compressed or uncompressed when the first arm shaft 251 rotates. For example, the first elastic member 293 may apply an axial elastic force to the first moving cam 291. For example, the first elastic member 293 may be compressed when the first moving cam 291 moves in the second axial direction D2. For example, the compressed first elastic member 293 may press the first moving cam 291 in the first axial direction D1. In an embodiment, the compressed first elastic member 293 may increase the frictional force between the first moving cam 291 and the second cam 282 of the cam member 280 and the frictional force between the first cam 281 of the cam member 280 and the first arm cam 253 of the first arm 250.

In an embodiment, the second elastic member 294 may be disposed between the second moving cam 292 and the fixing member 238. The second elastic member 294 may include a coil spring mounted on the second arm shaft 261. The second elastic member 294 may be compressed or uncompressed when the second arm shaft 261 rotates. For example, the second elastic member 294 may apply an axial elastic force to the second moving cam 292. For example, the second elastic member 294 may be compressed when the second moving cam 292 moves in the second axial direction D2. For example, the compressed second elastic member 294 may press the second moving cam 292 in the first axial direction D1. In an embodiment, the compressed second elastic member 294 may increase the frictional force between the second moving cam 292 and the fourth cam 284 of the cam member 280 and the frictional force between the third cam 283 of the cam member 280 and the second arm cam 263 of the second arm 260.

Figure 7A:
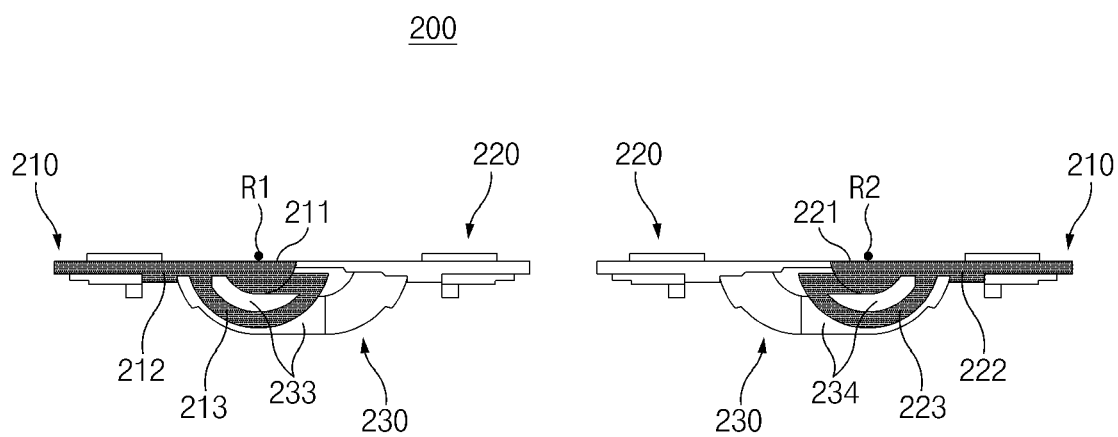
FIGS. 7A, 7B and 7C are sectional views illustrating rotational motions of rotary structures of the hinge structure according to various embodiments.
Figure 7B:
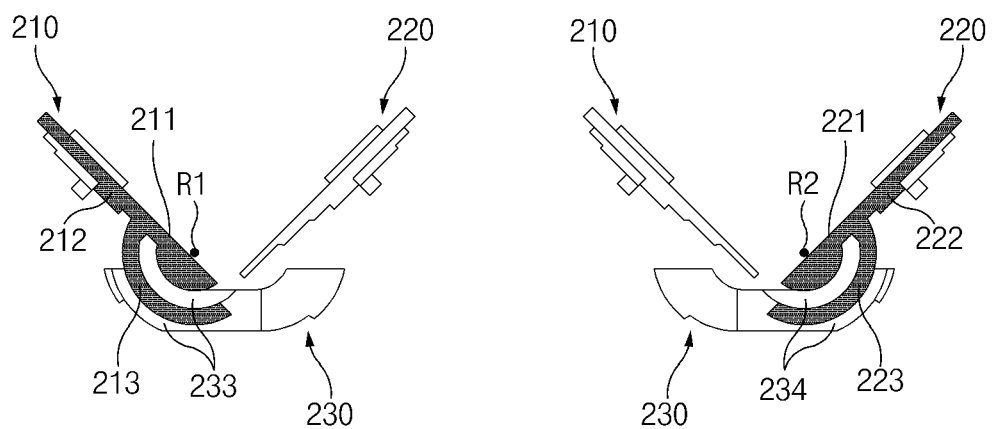
Figure 7C:
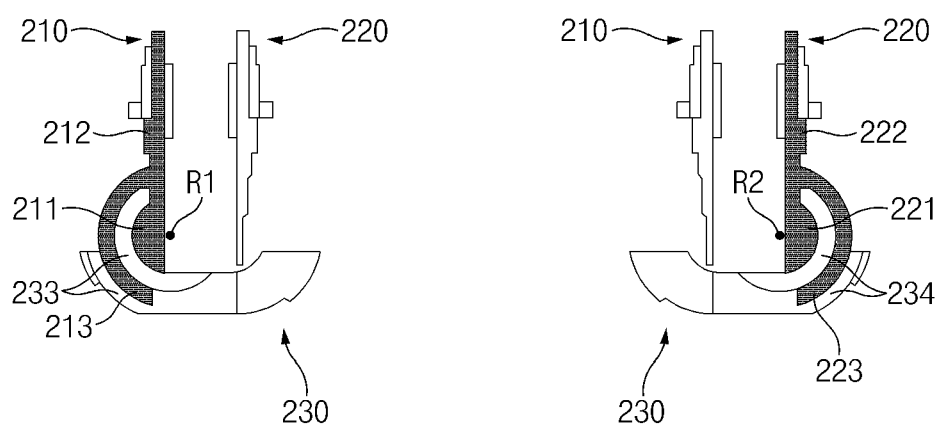

FIGS. 7A, 7B and 7C are diagrams illustrating rotational motions of the rotary structures of the hinge structure according to various embodiments. FIGS. 7A, 7B and 7C are sectional views taken along line A-A' of FIG. 4.

FIG. 7A is a sectional view illustrating the hinge structure in a fully unfolded state. FIG. 7B is a sectional view illustrating the hinge structure in a partially folded state. FIG. 7C is a sectional view illustrating the hinge structure in a fully folded state.

In an embodiment, the first guide rail 233 and the second guide rail 234 may be formed on the fixed structure 230. In an embodiment, the first guide rail 233 may have a substantially circular arc shape. For example, the center of the circular arc of the first guide rail 233 may be the first axis of rotation R1. That is, the first guide rail 233 may guide rotation of the first rotary structure 210 along a rotational path whose center is the first axis of rotation R1. In an embodiment, the second guide rail 234 may have a substantially circular arc shape. For example, the center of the circular arc of the second guide rail 234 may be the second axis of rotation R2. That is, the second guide rail 234 may guide rotation of the second rotary structure 220 along a rotational path whose center is the second axis of rotation R2.

In an embodiment, the first rotary structure 210 may include the first coupling portion 211 and the first extending portion 212. The first coupling portion 211 may have a substantially cylindrical shape. For example, the cross-section of the first coupling portion 211 may have a substantially circular arc shape. In an embodiment, the first rotary structure 210 may rotate about the first axis of rotation R1 in the state in which the first guide portion 213 of the first coupling portion 211 is accommodated in the first guide rail 233 of the fixed structure 230. For example, when the first extending portion 212 is folded or unfolded together with the first housing 110, the first rotary structure 210 may rotate along a rotational path having a circular arc shape whose center is the first axis of rotation R1.

In an embodiment, the second rotary structure 220 may include the second coupling portion 221 and the second extending portion 222. The second coupling portion 221 may have a substantially cylindrical shape. For example, the cross-section of the second coupling portion 221 may have a substantially circular arc shape. In an embodiment, the second rotary structure 220 may rotate about the second axis of rotation R2 in the state in which the second guide portion 223 is accommodated in the second guide rail 234. For example, when the second extending portion 222 is folded or unfolded together with the second housing 120, the second rotary structure 220 may rotate along a rotational path having a circular arc shape whose center is the second axis of rotation R2.

In an embodiment, the first axis of rotation R1 and the second axis of rotation R2 may be parallel to the axial direction of the hinge structure 200. In an embodiment, the first axis of rotation R1 and the second axis of rotation R2 may be formed above the first extending portion 212 of the first rotary structure 210 and the second extending portion 222 of the second rotary structure 220 in the Z-axis direction.

Referring to FIG. 7A, in the unfolded state, the first extending portion 212 may limit a rotational direction of the first rotary structure 210 to one direction. For example, a first end portion of the first guide rail 233 may be open, and a second end portion of the first guide rail 233 may be covered by the first extending portion 212. Accordingly, in the unfolded state, the first rotary structure 210 is rotatable about the first axis of rotation R1 in the clockwise direction and is not rotatable in the counterclockwise direction.

Referring to FIG. 7A, in the unfolded state, the second extending portion 222 may limit a rotational direction of the second rotary structure 220 to one direction. For example, a third end portion of the second guide rail 234 may be open, and a fourth end portion of the second guide rail 234 may be covered by the second extending portion 222. Accordingly, in the unfolded state, the second rotary structure 220 is rotatable about the second axis of rotation R2 in the counterclockwise direction and is not rotatable in the clockwise direction.

Figure 8A:
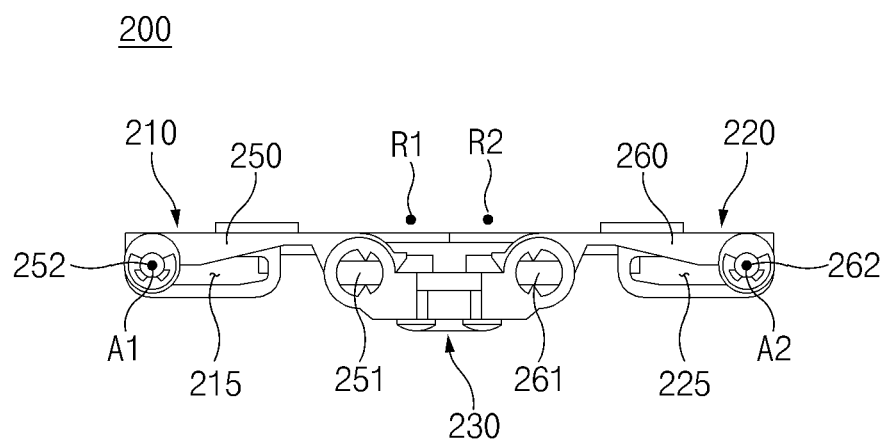
FIGS. 8A, 8B and 8C are diagrams illustrating rotational motions and sliding motions of arms and the rotary structures of the hinge structure according to various embodiments.
Figure 8B:
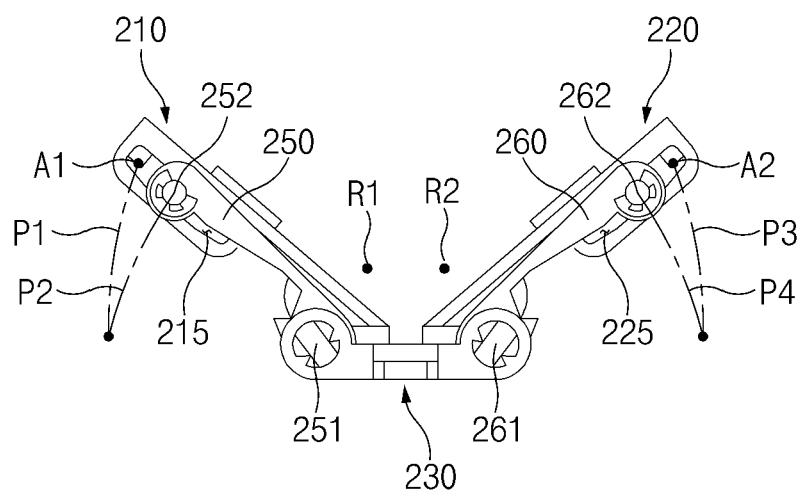
Figure 8C:
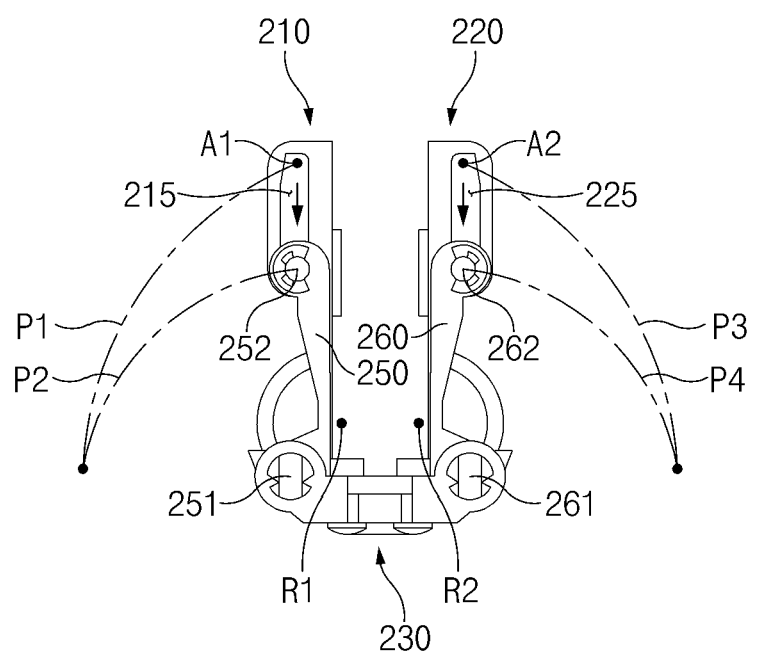

FIGS. 8A, 8B and 8C are diagrams illustrating rotary motions and sliding motions of the arms and the rotary structures of the hinge structure according to various embodiments. FIGS. 8A, 8B and 8C are views of the hinge structure, when viewed in the direction of arrow B in FIG. 4.

FIG. 8A is a view illustrating the hinge structure in a fully unfolded state. FIG. 8B is a view illustrating the hinge structure in a partially folded state. FIG. 8C is a view illustrating the hinge structure in a fully folded state.

Referring to FIGS. 8A, 8B and 8C, when the hinge structure 200 is folded or unfolded, the rotary structures 210 and 220 and the arms 250 and 260 may rotate about different axes. For example, the rotary structures 210 and 220 and the arms 250 and 260 may rotate along different rotational paths. Due to the difference in rotational path between the rotary structures 210 and 220 and the arms 250 and 260, the arms 250 and 260 may slide when the hinge structure 200 is folded or unfolded.

In an embodiment, the first rotary structure 210 may rotate about the first axis of rotation R1 in a first rotational direction. For example, in a folding motion, the first rotary structure 210 may rotate in the clockwise direction. For example, the point where the first sliding pin 252 is located in the first rotary structure 210 in the unfolded state may be defined as a first point A1. In folding and unfolding motions, the first point A1 of the first rotary structure 210 may move along a first rotational path P1.

Referring to FIG. 8, the first arm 250 and the first sliding pin 252 may rotate about the first arm shaft 251. For example, in a folding motion, the first arm 250 and the first sliding pin 252 may rotate in the clockwise direction. For example, in the unfolded state, the first sliding pin 252 may be located at the first point A1, and in the folded state, the first sliding pin 252 may be located at a position spaced apart from the first point A1 in a direction perpendicular to the axial direction. The first sliding pin 252 may move along a second rotational path P2 in folding and unfolding motions.

In various embodiments, the first rotational path P1 and the second rotational path P2 may differ from each other. For example, the first axis of rotation R1 and the first arm shaft 251 may be parallel to each other, but may not coincide with each other, and the rotational paths of the first rotary structure 210 and the first arm 250 may not coincide with each other.

Accordingly, in folding and unfolding motions, the first arm 250 and the first sliding pin 252 may slide relative to the first rotary structure 210. The sliding motion of the first sliding pin 252 and the first arm 250 may be guided as the first sliding pin 252 is accommodated in the first sliding groove 215 of the first rotary structure 210. In an embodiment, when a folding motion is performed in the unfolded state, the distance between the first sliding pin 252 and the first point A1 may increase. When an unfolding motion is performed in the fully folded state, the distance between the first sliding pin 252 and the first point A1 may decrease.

In an embodiment, the second rotary structure 220 may rotate about the second axis of rotation R2 in a second rotational direction. For example, in a folding motion, the second rotary structure 220 may rotate in the counterclockwise direction. For example, the point where the second sliding pin 262 is located in the second rotary structure 220 in the unfolded state may be defined as a second point A2. In folding and unfolding motions, the second point A2 may move along a third rotational path P3.

In an embodiment, the second arm 260 and the second sliding pin 262 may rotate about the second arm shaft 261. For example, in a folding motion, the second arm 260 and the second sliding pin 262 may rotate in the counterclockwise direction. For example, in the unfolded state, the second sliding pin 262 may be located at the second point A2, and in the folded state, the second sliding pin 262 may be located at a position spaced apart from the second point A2 in a direction perpendicular to the axial direction. The second sliding pin 262 may move along a fourth rotational path P4 in folding and unfolding motions.

In various embodiments, the third rotational path P3 and the fourth rotational path P4 may differ from each other. For example, the second axis of rotation R2 and the second arm shaft 261 may be parallel to each other, but may not coincide with each other, and the rotational paths of the second rotary structure 220 and the second arm 260 may not coincide with each other.

Accordingly, in folding and unfolding motions, the second arm 260 and the second sliding pin 262 may slide relative to the second rotary structure 220. The sliding motion of the second sliding pin 262 and the second arm 260 may be guided as the second sliding pin 262 is accommodated in the second sliding groove 225 of the second rotary structure 220. In an embodiment, when a folding motion is performed in the unfolded state, the distance between the second sliding pin 262 and the second point A2 may increase. When an unfolding motion is performed in the fully folded state, the distance between the second sliding pin 262 and the second point A2 may decrease.

Figure 9A:
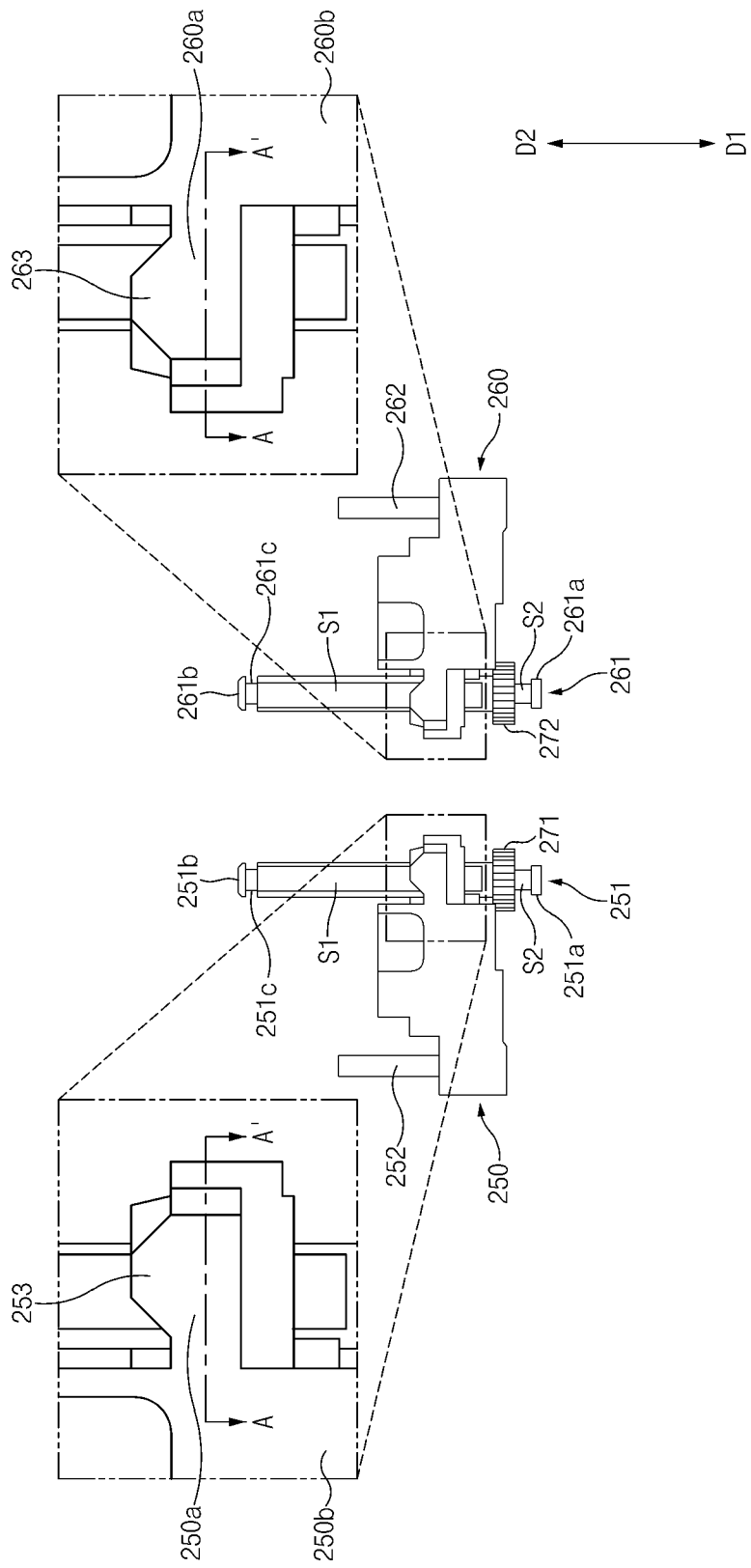
FIGS. 9A and 9B are diagrams illustrating a coupling of arm shafts and the arms of the hinge structure according to various embodiments.
Figure 9B:
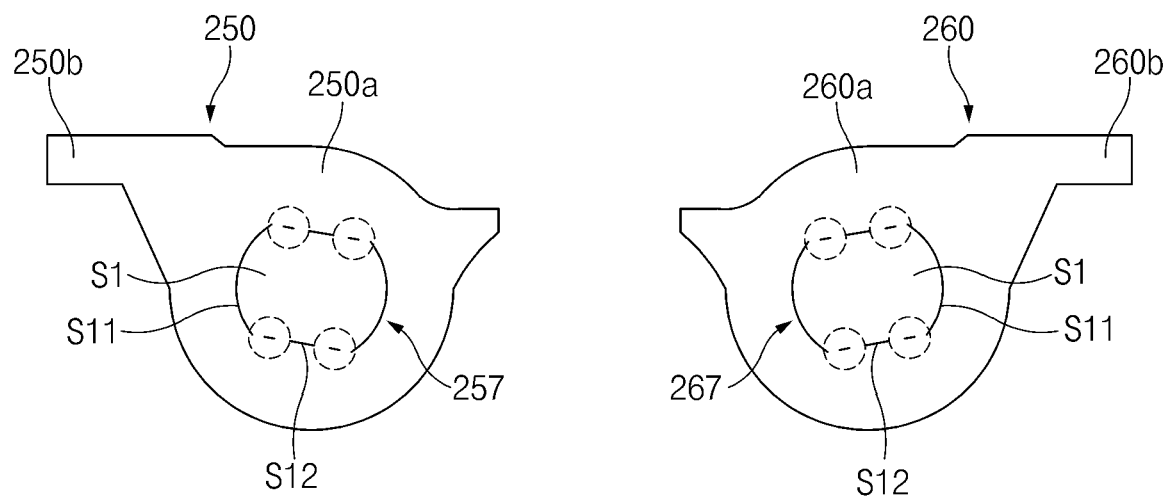

FIGS. 9A and 9B are diagrams illustrating a coupling of the arm shafts and the arms of the hinge structure according to various embodiments.

In an embodiment, the first arm shaft 251 may include a first end portion 251a located in the first axial direction D1 and a second end portion 251b located in the second axial direction D2. The first end portion 251a may be inserted into an opening or recess of a fixed structure (e.g., the fixed structure 230 of FIG. 5). The first gear 271 may be formed adjacent to the first end portion 251a. A first fixing ring may be coupled to the second end portion 251b. The second end portion 251b may have a fixing groove 251c into which the first fixing ring (e.g., the first fixing ring 259 of FIG. 5) is inserted. The second end portion 251b may have a smaller cross-section than a first shaft portion S1 and a second shaft portion S2 of the first arm shaft 251. For example, the first arm shaft 251 may be assembled to the first arm 250 by inserting the second end portion 251b into a through-hole 257 of the first arm 250. For example, the second end portion 251b of the first arm shaft 251 may completely overlap the first shaft portion S1 and the second shaft portion S2 when viewed in the axial direction.

In various embodiments, the first gear 271 may be integrally formed or coupled with the first arm shaft 251 and may rotate together with the first arm shaft 251.

In an embodiment, the first arm shaft 251 may include the first shaft portion S1 that is located between the first end portion 251a and the second end portion 251b and that has a polygonal cross-section perpendicular to the axial direction and the second shaft portion S2 that is located between the first end portion 251a and the second end portion 251b and that has a circular cross-section perpendicular to the axial direction. The cross-section of the first shaft portion S1 and the cross-section of the second shaft portion S2 that are perpendicular to the axial direction may have different shapes. For example, the first shaft portion S1 may have a larger cross-section than the second shaft portion S2. For example, referring to the drawing, the first shaft portion 51 may have a smaller cross-section than the second shaft portion S2. For example, the first shaft portion S1 of the first arm shaft 251 may completely overlap the second shaft portion S2 when viewed in the axial direction. The first arm 250, a cam member (e.g., the cam member 280 of FIG. 11), and a first moving cam (e.g., the first moving cam 291 of FIG. 12) may be coupled to the first shaft portion S1 of the first arm shaft 251. In various embodiments, the first shaft portion S1 may include flat areas S12 that are substantially flat and circular arc areas S11 that have a substantially circular arc shape.

In an embodiment, the first arm 250 may include a coupling portion 250a coupled to the first arm shaft 251 and an extending portion 250b that extends from the coupling portion 250a and into which the first sliding pin 252 is inserted. The coupling portion 250a may have the through-hole 257 through which the first arm shaft 251 passes. The through-hole 257 may have a polygonal shape substantially corresponding to the first shaft portion S1 of the first arm shaft 251. Referring to FIG. 9B, the first shaft portion S1 of the first arm shaft 251 may be press-fit into the through-hole 257 of the first arm 250. For example, the first shaft portion S1 of the first arm shaft 251 may be larger than the through-hole 257. For example, the flat areas S12 of the first shaft portion S1 of the first arm shaft 251 may be press-fit between inner surfaces of the through-hole 257. Accordingly, the first arm 250 may rotate together with the first arm shaft 251 and may not linearly move in the axial direction. For example, the first arm 250 may be fixed to a specified position on the first arm shaft 251 when viewed in the axial direction of the first arm shaft 251.

In an embodiment, the first arm cam 253 may be formed on the coupling portion 250a of the first arm 250. The first arm cam 253 may be formed around the through-hole 257 to surround the first arm shaft 251. The first arm cam 253 may be engaged with a first cam (e.g., the first cam 281 of FIG. 11) of the cam member.

In an embodiment, the second arm shaft 261 may include a first end portion 261a located in the first axial direction D1 and a second end portion 261b located in the second axial direction D2. The first end portion 261a may be inserted into an opening or recess of the fixed structure (e.g., the fixed structure 230 of FIG. 5). The second gear 272 may be formed adjacent to the first end portion 261a. A second fixing ring may be coupled to the second end portion 261b. The second end portion 261b may have a fixing groove 261c into which the second fixing ring (e.g., the second fixing ring 269 of FIG. 5) is inserted. The second end portion 261b may have a smaller cross-section than a first shaft portion S1 and a second shaft portion S2 of the second arm shaft 261. For example, the second arm shaft 261 may be assembled to the second arm 260 by inserting the second end portion 261b into a through-hole 267 of the second arm 260. For example, the second end portion 261b of the second arm shaft 261 may completely overlap the first shaft portion S1 and the second shaft portion S2 when viewed in the axial direction.

In various embodiments, the second gear 272 may be integrally formed or coupled with the second arm shaft 261 and may rotate together with the second arm shaft 261.

In an embodiment, the second arm shaft 261 may include the first shaft portion S1 that is located between the first end portion 261a and the second end portion 261b and that has a polygonal cross-section perpendicular to the axial direction and the second shaft portion S2 that is located between the first end portion 261a and the second end portion 261b and that has a circular cross-section perpendicular to the axial direction. The first shaft portion S1 may have a smaller cross-section than the second shaft portion S2. For example, the first shaft portion S1 of the second arm shaft 261 may completely overlap the second shaft portion S2 when viewed in the axial direction. The second arm 260, the cam member (e.g., the cam member 280 of FIG. 11), and a second moving cam (e.g., the second moving cam 292 of FIG. 12) may be coupled to the first shaft portion S1 of the second arm shaft 261. In various embodiments, the first shaft portion S1 may include flat areas S12 that are substantially flat and circular arc areas S11 that have a substantially circular arc shape.

In an embodiment, the second arm 260 may include a coupling portion 260a coupled to the second arm shaft 261 and an extending portion 260b that extends from the coupling portion 260a and into which the second sliding pin 262 is inserted. The coupling portion 260a may have the through-hole 267 through which the second arm shaft 261 passes. The through-hole 267 may have a polygonal shape substantially corresponding to the first shaft portion S1 of the second arm shaft 261. Referring to FIG. 9B, the first shaft portion S1 of the second arm shaft 261 may be press-fit into the through-hole 267 of the second arm 260. For example, the first shaft portion S1 of the second arm shaft 261 may be larger than the through-hole 267. For example, the flat areas S12 of the first shaft portion S1 of the second arm shaft 261 may be press-fit between inner surfaces of the through-hole 267. Accordingly, the second arm 260 may rotate together with the second arm shaft 261 and may not linearly move in the axial direction. For example, the second arm 260 may be fixed to a specified position on the second arm shaft 261 when viewed in the axial direction of the second arm shaft 261.

In an embodiment, the second arm cam 263 may be formed on the coupling portion 260a of the second arm 260. The second arm cam 263 may be formed around the through-hole 267 to surround the second arm shaft 261. The second arm cam 263 may be engaged with a second cam (e.g., the second cam 282 of FIG. 11) of the cam member.

Figure 10A:
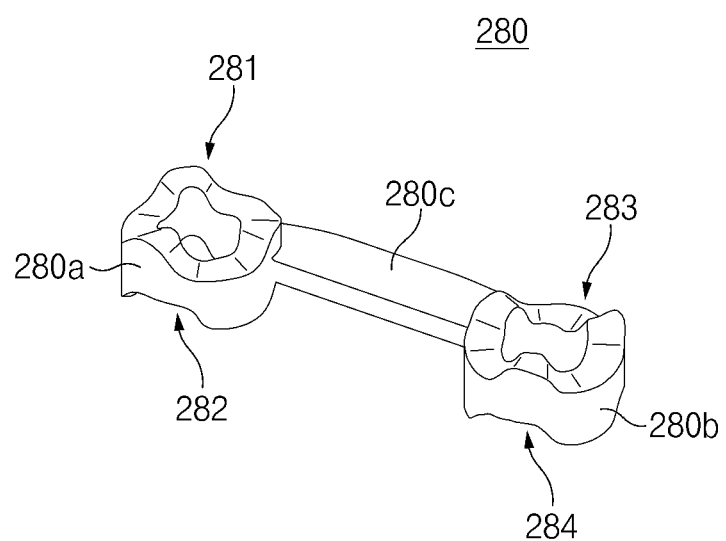
FIGS. 10A, 10B and 10C are diagrams illustrating a cam member of the hinge structure according to various embodiments.
Figure 10B:
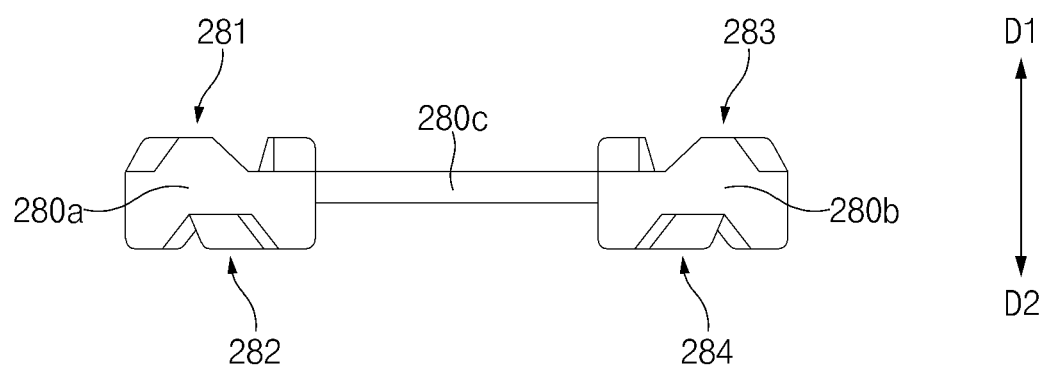
Figure 10C:
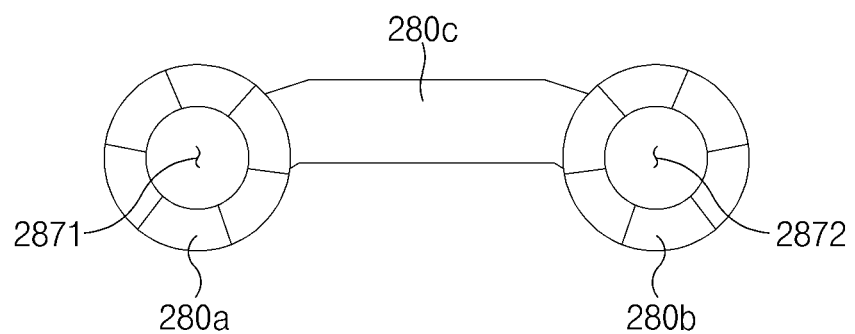
Figure 11A:
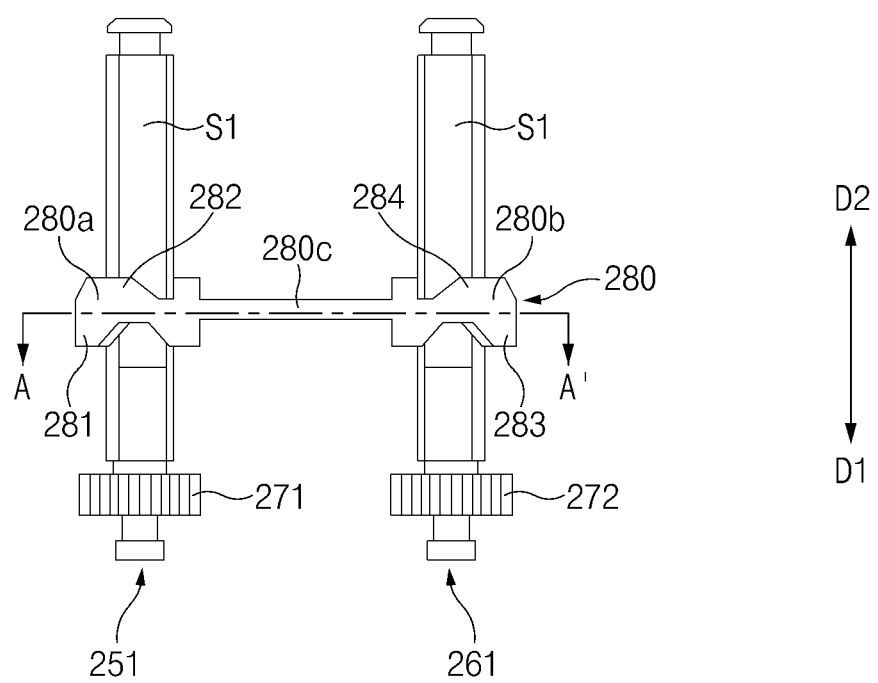
FIGS. 11A and 11B are diagrams illustrating a coupling of the arm shafts and the cam member of the hinge structure according to various embodiments.
Figure 11B:
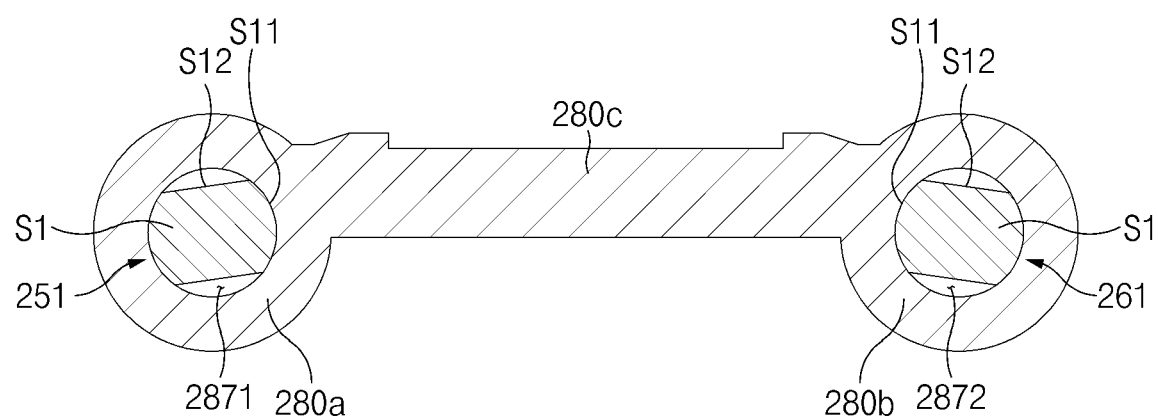

FIGS. 10A, 10B and 10C are diagrams illustrating the cam member of the hinge structure according to various embodiments. FIGS. 11A and 11B are diagrams illustrating a coupling of the arm shafts and the cam member of the hinge structure according to various embodiments.

In an embodiment, the cam member 280 may include the first portion 280a through which the first arm shaft 251 passes, the second portion 280b through which the second arm shaft 261 passes, and the connecting portion 280c connecting the first portion 280a and the second portion 280b.

In an embodiment, the first cam 281 and the second cam 282 may be formed on the first portion 280a. For example, the first cam 281 may be formed on a surface of the first portion 280a that faces the first axial direction D1. The first cam 281 may be engaged with a first arm cam (e.g., the first arm cam 253 of FIG. 9) of a first arm (e.g., the first arm 250 of FIG. 9). For example, the second cam 282 may be formed on a surface of the first portion 280a that faces the second axial direction D2. The second cam 282 may be engaged with a first moving cam (e.g., the first moving cam 291 of FIG. 12).

In an embodiment, the third cam 283 and the fourth cam 284 may be formed on the second portion 280b. For example, the third cam 283 may be formed on a surface of the second portion 280b that faces the first axial direction D1. The third cam 283 may be engaged with a second arm cam (e.g., the second arm cam 263 of FIG. 9) of a second arm (e.g., the second arm 260 of FIG. 9). For example, the fourth cam 284 may be formed on a surface of the second portion 280b that faces the second axial direction D2. The fourth cam 284 may be engaged with a second moving cam (e.g., the second moving cam 292 of FIG. 12).

In an embodiment, the connecting portion 280c may connect the first portion 280a and the second portion 280b such that the cam member 280 moves along a first arm shaft (e.g., the first arm shaft 251 of FIG. 11) and a second arm shaft (e.g., the second arm shaft 261 of FIG. 11). For example, the connecting portion 280c may extend from the first portion 280a to the second portion 280b in a direction perpendicular to the axial direction. For example, when the arms 250 and 260 fixed to the arm shafts 251 and 261 rotate, arm cams (e.g., the first arm cam 253 and the second arm cam 263 of FIG. 9) of the arms 250 and 260 and cams (e.g., the first cam 281 and the third cam 283) of the cam member 280 may push each other, or may move toward each other. At this time, the connecting portion 280c may connect the first portion 280a and the second portion 280b such that the first portion 280a and the second portion 280b of the cam member 280 linearly move in the axial direction without rotating about the arm shafts 251 and 261.

Referring to FIGS. 11A and 11B, the cam member 280 may be coupled to the arm shafts 251 and 261 to linearly move along the arm shafts 251 and 261 without rotating together with the arm shafts 251 and 261 when the arm shafts 251 and 261 rotate. For example, a first through-hole 2871 may be formed through the first portion 280a of the cam member 280, and a second through-hole 2872 may be formed through the second portion 280b of the cam member 280. In an embodiment, the first shaft portion 51 of the first arm shaft 251 may pass through the first through-hole 2871.

The first through-hole 2871 may be larger than the first shaft portion S1. For example, the first through-hole 2871 may have a circular cross-section. For example, an inner surface of the first through-hole 2871 may make contact with the circular arc areas S11 of the first shaft portion S1, but may not make contact with the flat areas S12 of the first shaft portion S1. In an embodiment, the first shaft portion S1 of the second arm shaft 261 may pass through the second through-hole 2872. The second through-hole 2872 may be larger than the first shaft portion S1. For example, the second through-hole 2872 may have a circular cross-section. For example, an inner surface of the second through-hole 2872 may make contact with the circular arc areas S11 of the first shaft portion S1, but may not make contact with the flat areas S12 of the first shaft portion S1. Accordingly, the cam member 280 may linearly move in the axial direction without being disturbed by rotational motions of the first arm shaft 251 and the second arm shaft 261.

In an embodiment, the first arm shaft 251 may be inserted into the first through-hole 2871, and the second arm shaft 261 may be inserted into the second through-hole 2872. Accordingly, the cam member 280 may be guided to linearly move along the arm shafts 251 and 261. For example, the first cam 281 of the cam member 280 may be engaged with the first arm cam 253 of the first arm 250, and the third cam 283 of the cam member 280 may be engaged with the second arm cam 263 of the second arm 260. When the arms 250 and 260 rotate together with the arm shafts 251 and 261, the cam member 280 may move in the axial direction along the arm shafts 251 and 261.

Figure 12A:
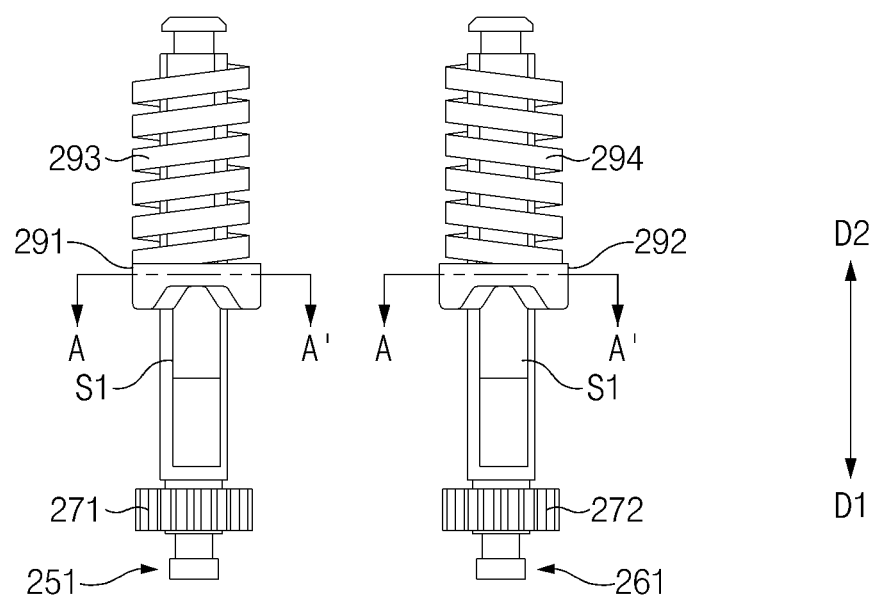
FIGS. 12A and 12B are diagrams illustrating a coupling of the arm shafts and moving cams of the hinge structure according to various embodiments.
Figure 12B:
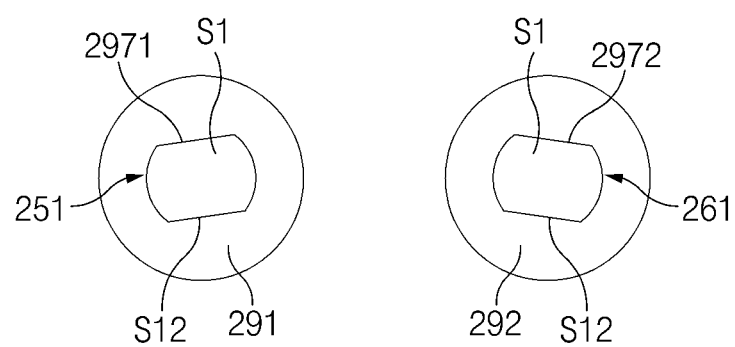
Figure 13A:
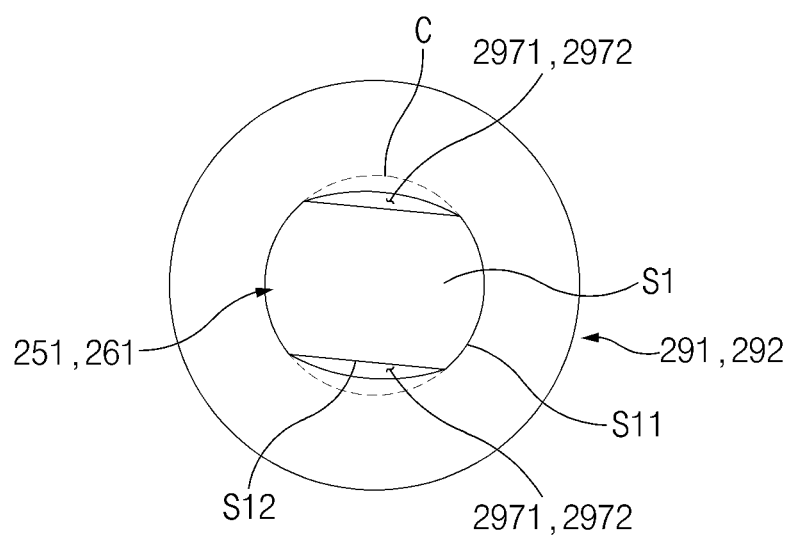
FIGS. 13A and 13B are diagrams illustrating an example of a coupling of the arm shafts and the moving cams of the hinge structure according to various embodiments.
Figure 13B:
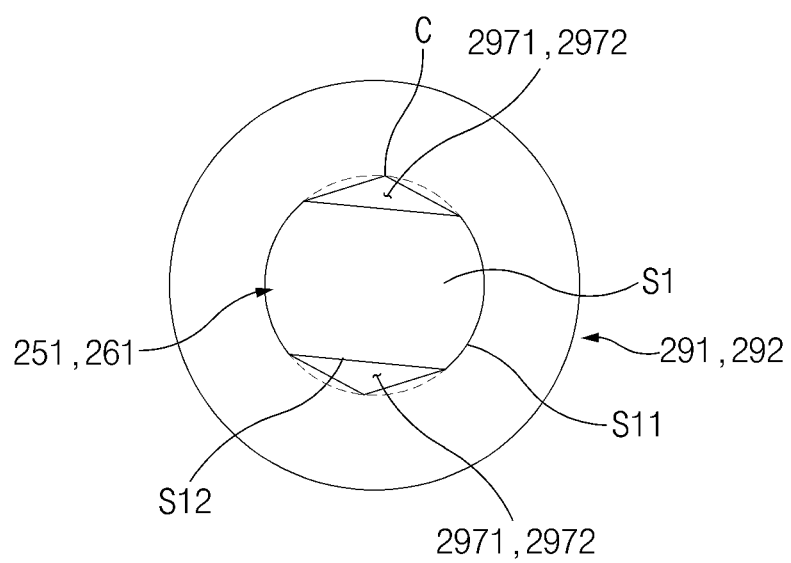

FIGS. 12A and 12B are diagrams illustrating a coupling of the arm shafts and the moving cams of the hinge structure according to various embodiments. FIGS. 13A and 13B are diagrams illustrating an example of a coupling of the arm shafts and the moving cams of the hinge structure according to various embodiments.

In an embodiment, the first moving cam 291 may be coupled to the first arm shaft 251. For example, the first moving cam 291 may rotate together with the first arm shaft 251 and may move along the axial direction of the first arm shaft 251. For example, the first moving cam 291 may have a third through-hole 2971 formed therein. The third through-hole 2971 may have a shape substantially corresponding to the cross-section of the first shaft portion S1 of the first arm shaft 251. For example, the flat areas S12 and the circular arc areas S11 of the first shaft portion S1 may make contact with inner surfaces of the third through-hole 2971.

In an embodiment, the first moving cam 291 may be engaged with a second cam (e.g., the second cam 282 of FIG. 10) of a cam member (e.g., the cam member 280 of FIG. 10). When the cam member 280 linearly moves, the first moving cam 291 may move along the first arm shaft 251 while rotating together with the first arm shaft 251. For example, when the cam member 280 moves in the second axial direction D2, the first moving cam 291 may compress the first elastic member 293. For example, when the cam member 280 moves in the first axial direction D1, the first moving cam 291 may be moved in the first axial direction D1 by the elastic force of the first elastic member 293.

In an embodiment, the second moving cam 292 may be coupled to the second arm shaft 261. For example, the second moving cam 292 may rotate together with the second arm shaft 261 and may move along the axial direction of the second arm shaft 261. For example, the second moving cam 292 may have a fourth through-hole 2972 formed therein. The fourth through-hole 2972 may have a shape substantially corresponding to the cross-section of the first shaft portion S1 of the second arm shaft 261. For example, the flat areas S12 and the circular arc areas S11 of the first shaft portion S1 may make contact with inner surfaces of the fourth through-hole 2972.

In an embodiment, the second moving cam 292 may be engaged with a fourth cam (e.g., the fourth cam 284 of FIG. 10) of the cam member (e.g., the cam member 280 of FIG. 10). When the cam member 280 linearly moves, the second moving cam 292 may move along the second arm shaft 261 while rotating together with the second arm shaft 261. For example, when the cam member 280 moves in the second axial direction D2, the second moving cam 292 may compress the second elastic member 294. For example, when the cam member 280 moves in the first axial direction D1, the second moving cam 292 may be moved in the first axial direction D1 by the elastic force of the second elastic member 294.

Referring to FIGS. 13A and 13B, the through-holes 2971 and 2972 of the moving cams 291 and 292 may be formed in various shapes. For example, the inner surfaces of the through-holes 2971 and 2972 of the moving cams 291 and 292 may not make contact with the flat areas S12 of the first shaft portions S1 of the arm shafts 251 and 261. For example, virtual circles C having the same radius of curvature with respect to the circular arc areas S11 of the first shaft portions S1 of the arm shafts 251 and 261 may be defined. The inner surfaces of the through-holes 2971 and 2972 of the moving cams 291 and 292 may be at least partially smaller than the virtual circles C. For example, referring to FIG. 13A, the inner surfaces of the through-holes 2971 and 2972 may be curved surfaces having different curvatures from the circular arc areas S11. For example, referring to FIG. 13B, the inner surfaces of the through-holes 2971 and 2972 may have polygonal shapes in contact with the virtual circles C extending from the circular arc areas S11. Accordingly, the moving cams 291 and 292 may rotate together with the arm shafts 251 and 261 when the arm shafts 251 and 261 rotate. Furthermore, the moving cams 291 and 292 may linearly move in the axial direction while being guided by the arm shafts 251 and 261.

Figure 14A:
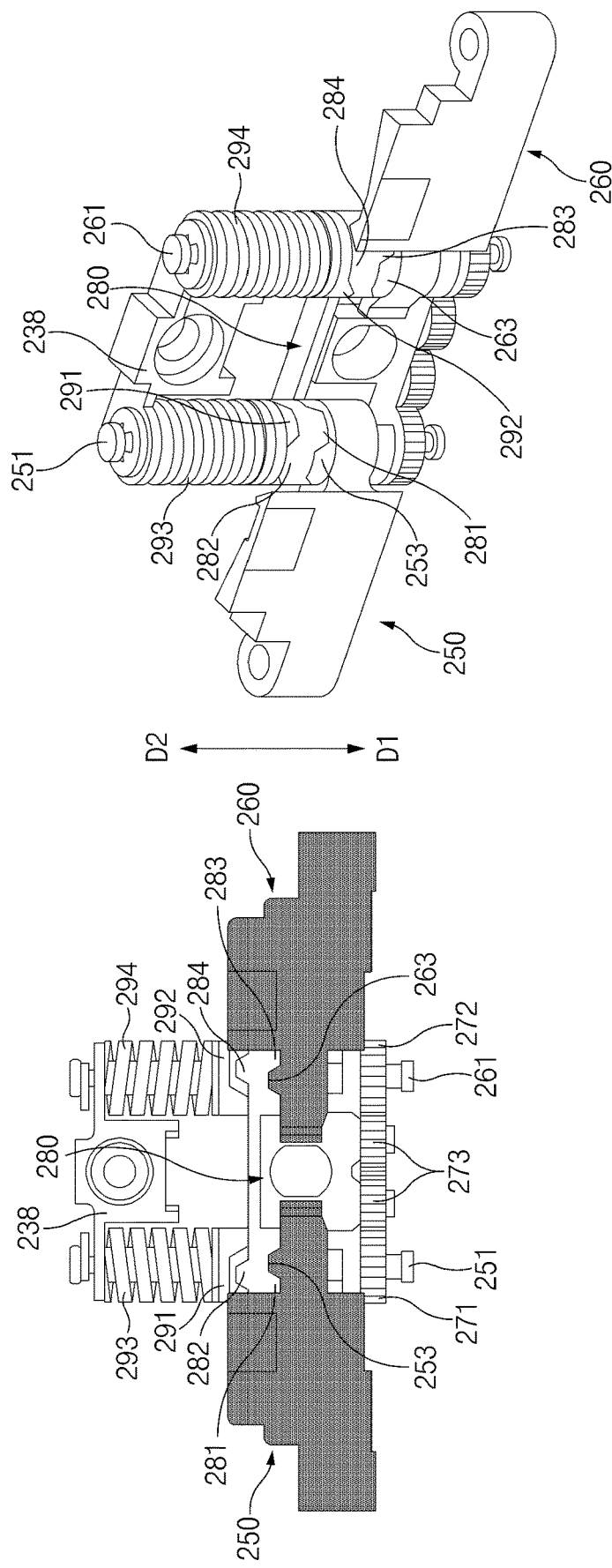
FIG. 14A is a perspective view illustrating an unfolded state of the hinge structure according to various embodiments.
Figure 14B:
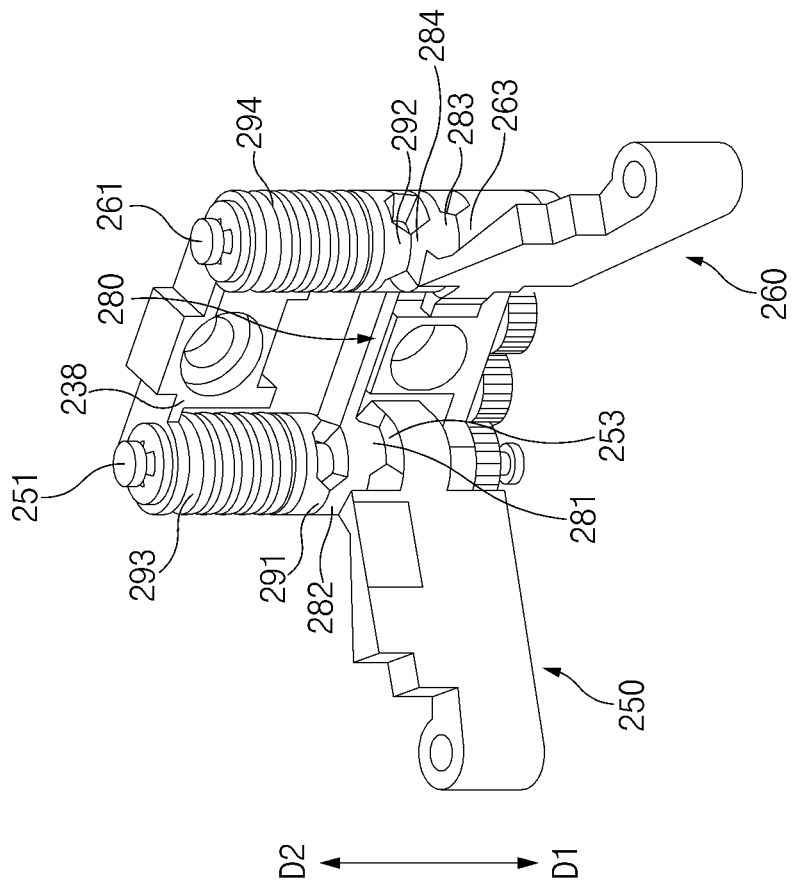
FIG. 14B is a perspective view illustrating a partially folded state of the hinge structure according to various embodiments.
Figure 14B:
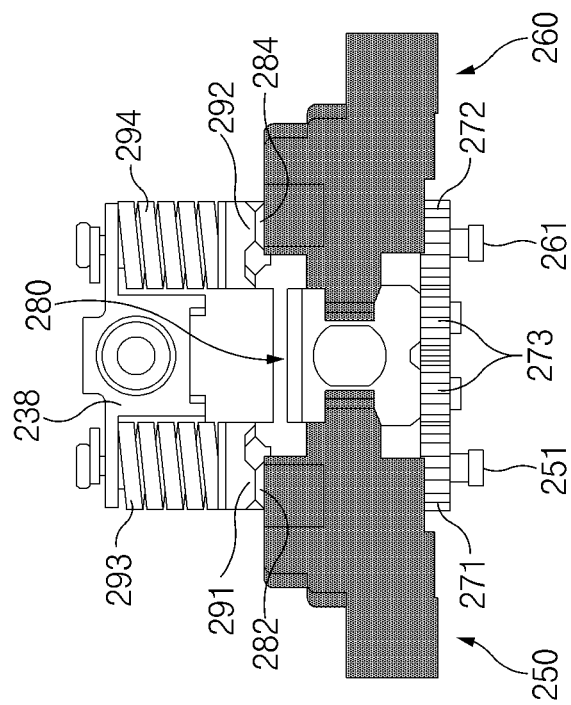
Figure 14C:
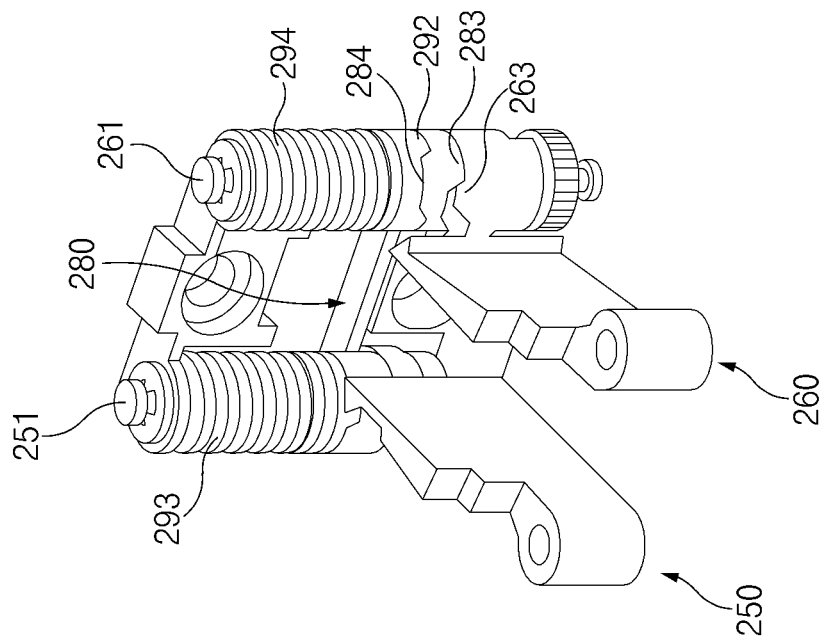
FIG. 14C is a perspective view illustrating a fully folded state of the hinge structure according to various embodiments.
Figure 14C:
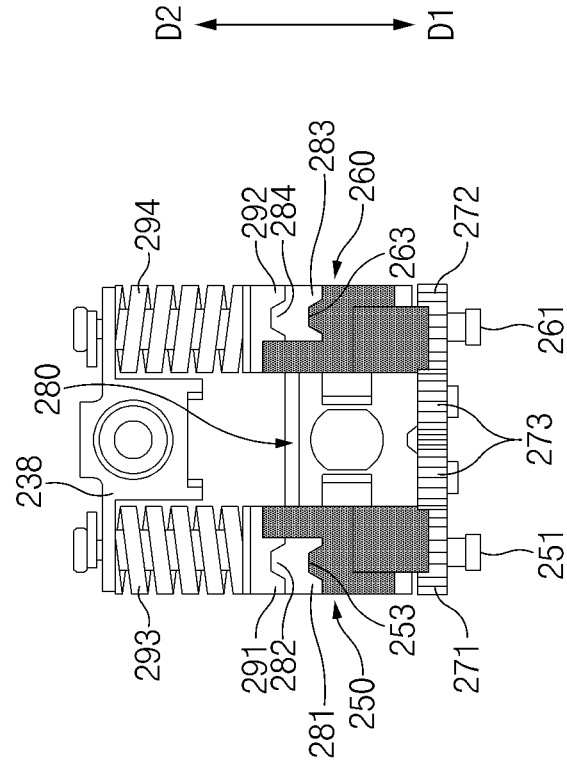

FIGS. 14A, 14B and 14C are diagrams illustrating motions of the arm structure and the friction structure of the hinge structure according to various embodiments. FIG. 14A illustrates a fully unfolded state of the hinge structure, FIG. 14B illustrates a partially folded state of the hinge structure, and FIG. 14C illustrates a fully folded state of the hinge structure.

In an embodiment, the arm structure 201 may include the first arm shaft 251, the second arm shaft 261, the gear structure 270, the first arm 250, and the second arm 260. The gear structure 270 may include the first gear 271 formed on the first arm shaft 251, the second gear 272 formed on the second arm shaft 261, and the connecting gears 273 connecting the first gear 271 and the second gear 272.

In an embodiment, the friction structure 202 may include the first arm cam 253 formed on the first arm 250, the second arm cam 263 formed on the second arm 260, the cam member 280, the first moving cam 291, the second moving cam 292, the first elastic member 293, and the second elastic member 294.

In an embodiment, the gear structure 270 may allow the first arm shaft 251 and the second arm shaft 261 to rotate in opposite directions by the same angle. To this end, an even number of connecting gears 273 may be provided. In an embodiment, when the electronic device 100 is folded or unfolded, the first rotary structure 210 and the second rotary structure 220 of the hinge structure 200 may rotate in opposite directions. For example, the first arm 250 may rotate in the same direction together with the first rotary structure 210. The first arm shaft 251 may be press-fit into the first arm 250 and may thus rotate together with the first arm 250. When the first arm shaft 251 rotates, the first gear 271 integrally formed with the first arm shaft 251 may rotate. The two connecting gears 273 engaged with the first gear 271 may rotate the second gear 272 in the opposite direction to the rotational direction of the first gear 271. Accordingly, the second arm shaft 261, the second arm 260, and the second rotary structure 220 may rotate in the opposite direction to the rotational direction of the first arm shaft 251, the first arm 250, and the first rotary structure 210. The first gear 271 and the second gear 272 may include the same gear teeth and may rotate through the same angle.

In an embodiment, when viewed in the extension direction of the first arm shaft 251, the first arm cam 253, the first portion 280a of the cam member 280, the first moving cam 291, and the first elastic member 293 may be disposed. The first arm cam 253 may be engaged with the first cam 281 of the cam member 280, and the second cam 282 of the cam member 280 may be engaged with the first moving cam 291. The first elastic member 293 may be disposed between the first moving cam 291 and the fixing member 238.

In an embodiment, when viewed in the extension direction of the second arm shaft 261, the second arm cam 263, the second portion 280b of the cam member 280, the second moving cam 292, and the second elastic member 294 may be disposed. The second arm cam 263 may be engaged with the third cam 283 of the cam member 280, and the fourth cam 284 of the cam member 280 may be engaged with the second moving cam 292. The second elastic member 294 may be disposed between the second moving cam 292 and the fixing member 238.

In an embodiment, cam structures coupled to the first arm shaft 251 and cam structures coupled to the second arm shaft 261 may have the same profile. For example, the first arm cam 253 and the second arm cam 263 may have the same profile. For example, the first cam 281 and the third cam 283 of the cam member 280 may have the same profile. For example, the second cam 282 and the fourth cam 284 of the cam member 280 may have the same profile. For example, the first moving cam 291 and the second moving cam 292 may have the same profile.

In an embodiment, when the hinge structure is changed from an unfolded state or a fully folded state to a folded state, the first arm cam 253 may rotate about the first arm shaft 251, and the second arm cam 263 may rotate about the second arm shaft 261. The cam member 280 may linearly move in a direction away from the first arm 250 and the second arm 260. For example, the cam member 280 may move in the second axial direction D2. For example, protruding portions of the first arm cam 253 may move to make contact with protruding portions of the first cam 281, and protruding portions of the second arm cam 263 may move to make contact with protruding portions of the third cam 283. The cam member 280 may integrally linearly move in the second axial direction D2 without rotation of the first portion 280a and the second portion 280b. The first moving cam 291 may be moved in the second axial direction D2 by the cam member 280, which moves in the second axial direction D2, while rotating about the first arm shaft 251. For example, the first moving cam 291 may rotate and linearly move such that protruding portions of the first moving cam 291 make contact with protruding portions of the second cam 282 of the cam member 280. The second moving cam 292 may be moved in the second axial direction D2 by the cam member 280, which moves in the second axial direction D2, while rotating about the second arm shaft 261. For example, the second moving cam 292 may rotate and linearly move such that protruding portions of the second moving cam 292 make contact with protruding portions of the fourth cam 284 of the cam member 280. Accordingly, the first moving cam 291 and the second moving cam 292 may compress the first elastic member 293 and the second elastic member 294. In various embodiments, end portions of the first elastic member 293 and the second elastic member 294 that face the second axial direction D2 may be supported by the fixing member 238, and thus the first elastic member 293 and the second elastic member 294 may be compressed by the movement of the first moving cam 291 and the second moving cam 292.

In an embodiment, when the hinge structure is changed from a folded state to an unfolded state or a fully folded state, the first arm cam 253 may rotate about the first arm shaft 251, and the second arm cam 263 may rotate about the second arm shaft 261. The cam member 280 may linearly move in a direction toward the first arm 250 and the second arm 260. For example, the cam member 280 may move in the first axial direction D1. For example, the protruding portions of the first arm cam 253 may move to make contact with recessed portions of the first cam 281, and the protruding portions of the second arm cam 263 may move to make contact with recessed portions of the third cam 283. The first portion 280a and the second portion 280b of the cam member 280 may be connected by the connecting portion 280c such that the first cam 281 and the third cam 283 integrally move. The first moving cam 291 may rotate about the first arm shaft 251. The first moving cam 291 may be pressed in the first axial direction D1 by the elastic force of the first elastic member 293 while rotating. The first moving cam 291 may rotate and linearly move such that the protruding portions of the first moving cam 291 make contact with recessed portions of the second cam 282 of the cam member 280. The second moving cam 292 may rotate about the second arm shaft 261. The second moving cam 292 may be pressed in the first axial direction D1 by the elastic force of the second elastic member 294 while rotating. The second moving cam 292 may rotate and linearly move such that the protruding portions of the second moving cam 292 make contact with recessed portions of the fourth cam 284 of the cam member 280. The first elastic member 293 and the second elastic member 294 may be uncompressed as the first moving cam 291 and the second moving cam 292 move in the first axial direction D1.

In an embodiment, a large force capable of compressing the elastic members 293 and 294 may be required to change the hinge structure 200 from a fully folded state or an unfolded state to a folded state. That is, the hinge structure 200 in the unfolded state or the fully folded state may provide a detent function of maintaining the unfolded state or the fully folded state without being changed to another state (e.g., without being unfolded or folded) when a relatively smaller force than the force required to compress the elastic members 293 and 294 is applied.

For example, the restoring force of the display 140 may act to unfold the hinge structure 200. Due to this, unlike in the unfolded state, the restoring force of the display 140 may act on the hinge structure 200 in the fully folded state.

Therefore, the hinge structure 200 may be configured such that the force required to change the hinge structure 200 from the fully folded state to the folded state (e.g., the force required to compress the elastic members 293 and 294) is greater than the restoring force of the display 140. Accordingly, an unfolding motion not intended by a user may be prevented from being performed by the restoring force of the display 140.

Figure 15:
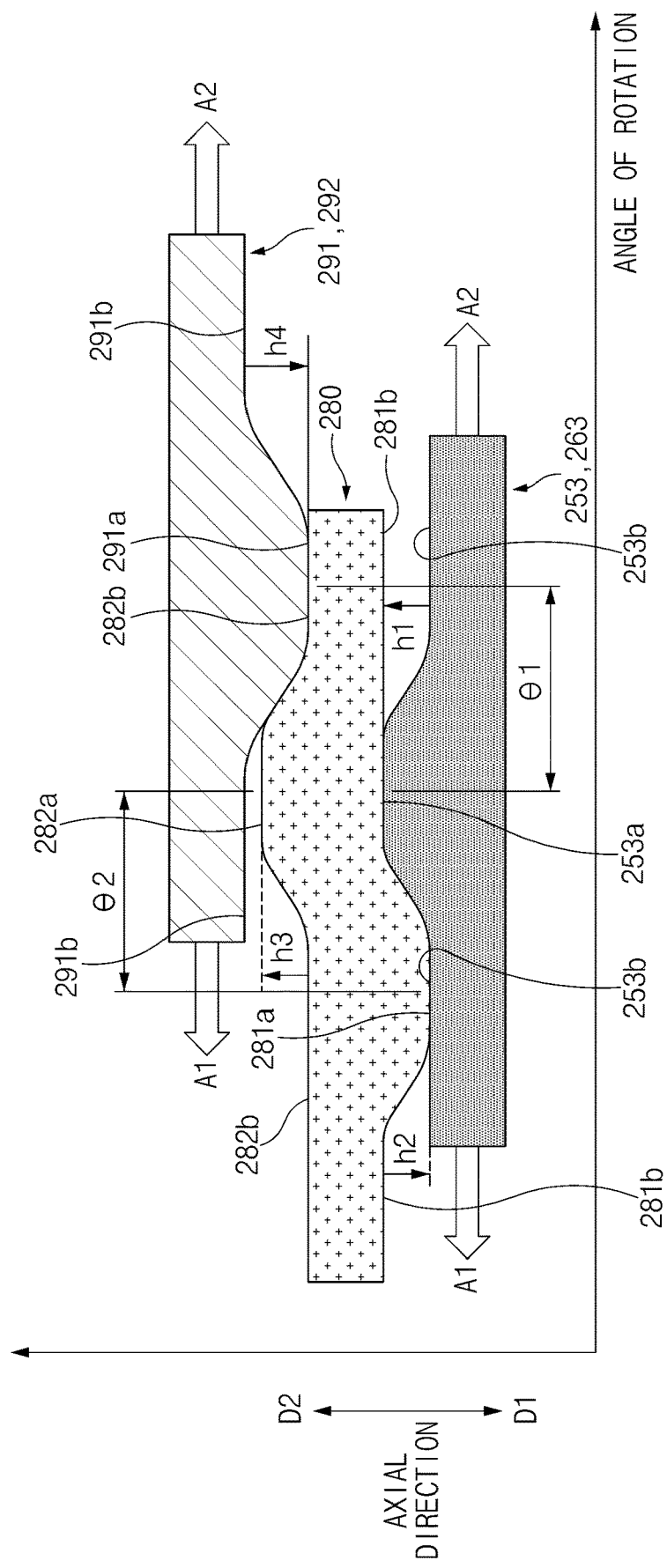
FIG. 15 is a diagram illustrating a cam profile of the hinge structure according to various embodiments.

FIG. 15 is a diagram illustrating a cam profile of the hinge structure according to various embodiments.

Referring to FIG. 15, when the hinge structure 200 is folded or unfolded, the arm cams 253 and 263 may rotate together with the arm shafts 251 and 261, the moving cams 291 and 292 may linearly move in the axial direction while rotating together with the arm shafts 251 and 261, and the cam member 280 may linearly move in the axial direction without rotating. For example, when the hinge structure 200 is folded, the arms shafts 251 and 261 and the moving cams 291 and 292 may rotate in a first rotational direction A1, and when the hinge structure 200 is unfolded, the arms shafts 251 and 261 and the moving cams 291 and 292 may rotate in a second rotational direction A2.

In an embodiment, the arm cams 253 and 263 may include first protruding portions 253a. The first protruding portions 253a may protrude in the second axial direction D2. In an embodiment, the moving cams 291 and 292 may include fourth protruding portions 291a. The fourth protruding portions 291a may protrude in the first axial direction D1. In an embodiment, the first cam 281 and the third cam 283 of the cam member 280 may include second protruding portions 281a engaged with the first protruding portions 253a. The second cam 282 and the fourth cam 284 of the cam member 280 may include third protruding portions 282a engaged with the fourth protruding portions 291a.

In an embodiment, the cam profile of the hinge structure 200 may be configured such that the third protruding portions 282a and the fourth protruding portions 291a make surface-to-surface contact with each other when the first protruding portions 253a and the second protruding portions 281a make surface-to-surface contact with each other. For example, when the hinge structure 200 is changed from an unfolded state or a fully folded state to a folded state, the arm cams 253 and 263 may rotate such that the first protruding portions 253a and the second protruding portions 281a make surface-to-surface contact with each other, and the moving cams 291 and 292 may rotate such that the third protruding portions 282a and the fourth protruding portions 291a make surface-to-surface contact with each other. Phase differences between the cam member 280, the moving cams 291 and 292, and the arm cams 253 and 263 may be determined to enable the above-described motion.

In an embodiment, the moving cams 291 and 292 and the arm cams 253 and 263 may have a first phase difference. In an embodiment, the first protruding portions 253a of the arm cams 253 and 263 and the fourth protruding portions 291a of the moving cams 291 and 292 may be spaced apart from each other by a first angle $\theta1$. In an embodiment, the cam member 280 may be configured such that the first cam 281 and the third cam 283 has a second phase difference from the second cam 282 and the fourth cam 284. The first phase difference and the second phase difference may be substantially the same as each other. For example, the second protruding portions 281a and the third protruding portions 282a of the cam member 280 may be spaced apart from each other by a second angle $\theta2$ identical to the first angle $\theta1$. Accordingly, when the first protruding portions 253a and the fourth protruding portions 291a rotate through the same angle (e.g., the first angle or the second angle), the first protruding portions 253a may make surface-to-surface contact with the second protruding portions 281a, and the third protruding portions 282a make surface-to-surface contact with the fourth protruding portions 291a.

In various embodiments, the hinge structure 200 may have various forms of protruding portions depending on a required frictional force and/or motion. For example, the heights of protruding portions and/or the slopes of inclined surfaces may be variously determined. However, even in this case, the first phase difference and the second phase difference may be equal to each other as described above.

FIGS. 16A, 16B, 16C, 16D and 16E are diagrams illustrating the cam profile of the hinge structure and a motion of the friction structure according to various embodiments.

Figure 16A:
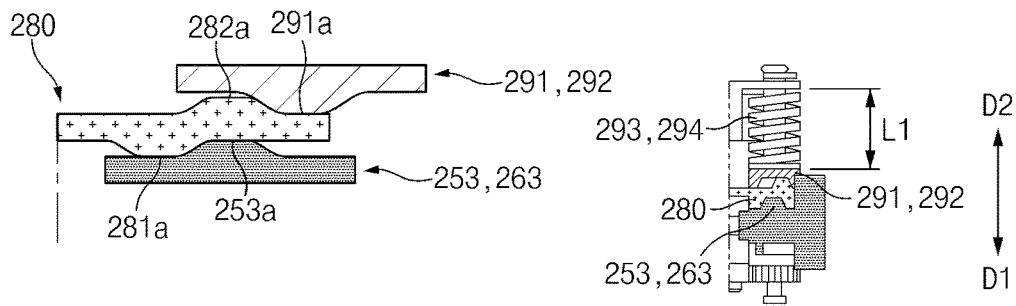
FIGS. 16A, 16B, 16C, 16D and 16E are diagrams illustrating the cam profile of the hinge structure and a motion of a friction structure according to various embodiments.
Figure 16B:
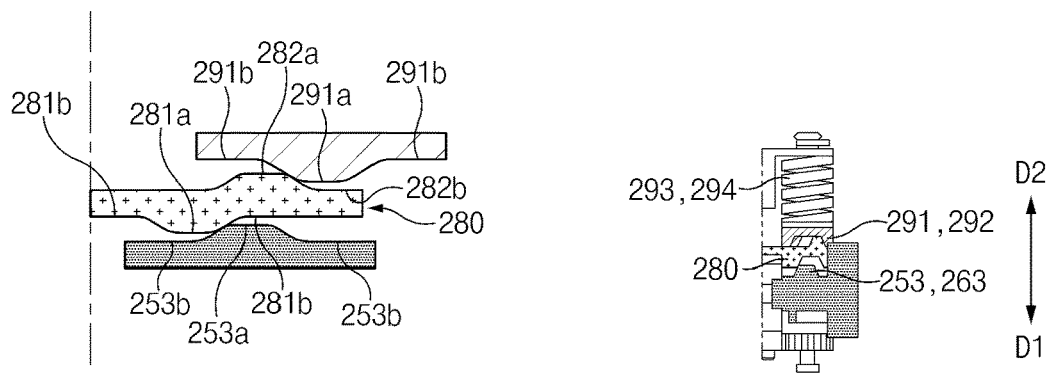
Figure 16C:
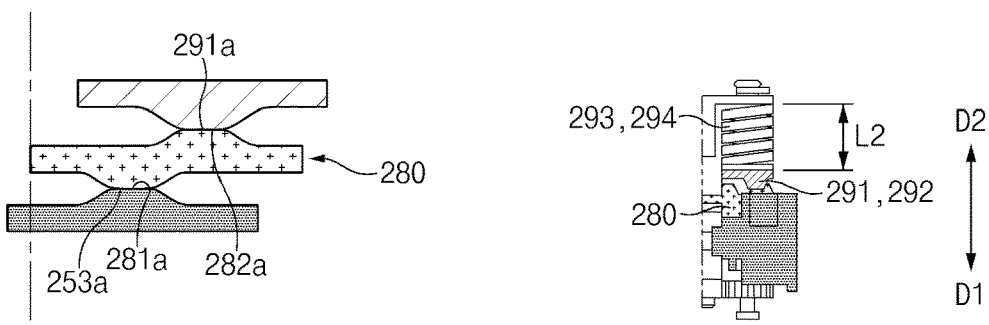
Figure 16D:
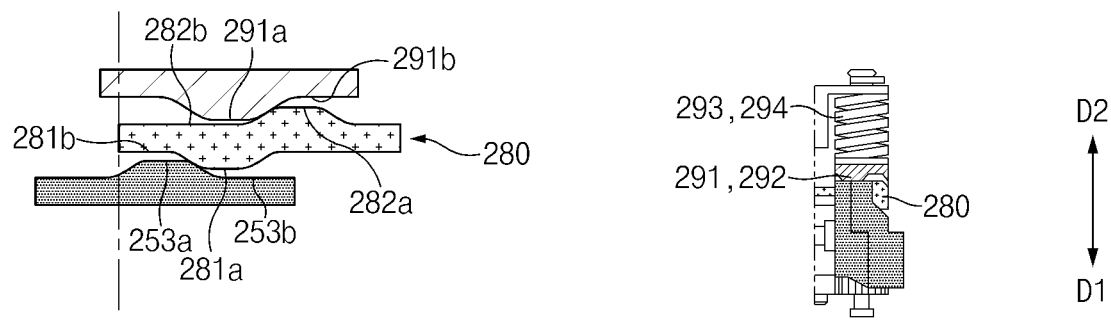
Figure 16E:
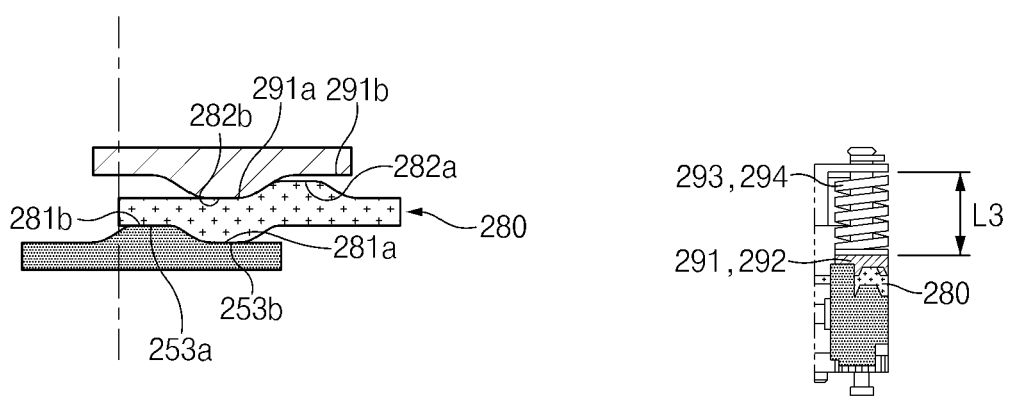

FIG. 16A is a diagram illustrating the cam profile and the friction structure in an unfolded state of the hinge structure 200. FIG. 16C is a diagram illustrating the cam profile and the friction structure in a free-stop state of the hinge structure 200. FIG. 16E is a diagram illustrating the cam profile and the friction structure in a fully folded state of the hinge structure 200. FIG. 16B is a diagram illustrating a state in which the hinge structure 200 is changed from the unfolded state to the free-stop state. FIG. 16D is a diagram illustrating a state in which the hinge structure 200 is changed from the free-stop state to the fully folded state.

Referring to FIGS. 2A, 2B, and 2C together, the free-stop state may include any state (e.g., the partially folded state illustrated in FIG. 2B) between the unfolded state and the fully folded state. For example, the free-stop state may include a state in which the folding area 143 of the display 140 remains curved. For example, the free-stop state may include a state in which the folding area 143 of the display 140 is curved and the first edge P1 of the first housing 110 and the second edge P2 of the second housing 120 are spaced apart from each other. For example, the free-stop state may include a state in which the third edge P3 of the first housing 110 and the fourth edge P4 of the second housing 120 form an angle smaller than that in the unfolded state (e.g., 180 degrees).

According to various embodiments, the electronic device 100 may include an out-folding electronic device. In the out-folding electronic device, the free-stop state may include a state in which the third edge P3 of the first housing 110 and the fourth edge P4 of the second housing 120 form an angle greater than that in the fully folded state (e.g., 180 degrees).

For example, the free-stop state may refer to the state in which a relatively large force is required to fold or unfold the hinge structure 200. For example, the force required to fold or unfold the hinge structure 200 in the free-stop state may be greater than the restoring force of the display 140. Accordingly, in the free-stop state, the hinge structure 200 may be prevented from being folded or unfolded by the restoring force of the display 140 irrespective of a user's intention.

For example, the free-stop state may include a state in which the elastic members 293 and 294 are compressed to the maximum so that the frictional forces between the cam structures (e.g., the arm cams 253 and 263, the cam member 280, and the moving cams 291 and 292) are increased. Furthermore, because the frictional forces between the cam structures are increased in the free-stop state, an arbitrary folded state may be stably maintained as long as a larger force greater than the frictional forces is not applied to the electronic device 100 or the hinge structure 200. Accordingly, the hinge structure 200 and the electronic device 100 may stably maintain various folded states in the free-stop section.

The first protruding portions 253a illustrated may include the protruding portions formed on the first arm cam 253 and the protruding portions formed on the second arm cam 263. The second protruding portions 281a illustrated may include the protruding portions formed on the first cam 281 and the protruding portions formed on the third cam 283. The third protruding portions 282a illustrated may include the protruding portions formed on the second cam 282 and the protruding portions formed on the fourth cam 284. The fourth protruding portions 291a illustrated may include the protruding portions formed on the first moving cam 291 and the protruding portions formed on the second moving cam 292.

In the unfolded state of FIG. 16A, the first protruding portions 253a of the arm cams 253 and 263 may make contact with second recessed portions 281b of the cam member 280, and the second protruding portions 281a of the cam member 280 may make contact with first recessed portions 253b of the arm cams 253 and 263. The third protruding portions 282a of the cam member 280 may make contact with fourth recessed portions 291b of the moving cams 291 and 292. The fourth protruding portions 291a of the moving cams 291 and 292 may make contact with third recessed portions 282b of the cam member 280. The elastic members 293 and 294 may have a first length L1 greater than a second length L2. When the hinge structure 200 is in the unfolded state, the elastic members 293 and 294 may be uncompressed, as compared with when the hinge structure 200 is in the free-stop state of FIG. 16C. For example, in the unfolded state, the elastic members 293 and 294 may be less compressed than in the free-stop state.

Referring to FIG. 16B, when the hinge structure 200 is changed from the unfolded state to the free-stop state, the arm shafts 251 and 261 may be rotated by rotation of the rotary structures 210 and 220 and the arms 250 and 260, and the arm cams 253 and 263 and the moving cams 291 and 292 may rotate together with the arm shafts 251 and 261. For example, the arm cams 253 and 263 and the moving cams 291 and 292 may move leftward in the illustrated cam profile. At this time, the first protruding portions 253a of the arm cams 253 and 263 may move toward the second protruding portions 281a of the cam member 280 along inclined surfaces of the cam member 280. The fourth protruding portions 291a of the moving cams 291 and 292 may move toward the third protruding portions 282a of the cam member 280 along inclined surfaces of the cam member 280. At this time, the cam member 280 and the moving cams 291 and 292 may move in the second axial direction D2. The moving cams 291 and 292 may compress the elastic members 293 and 294.

In the free-stop state of FIG. 16C, the first protruding portions 253a of the arm cams 253 and 263 may make contact with the second protruding portions 281a of the cam member 280, and the third protruding portions 282a of the cam member 280 may make contact with the fourth protruding portions 291a of the moving cams 291 and 292. At this time, the cam member 280 and the moving cams 291 and 292 may be in the state of moving in the second axial direction D2 by a predetermined distance. For example, the moving cams 291 and 292 may compress the elastic members 293 and 294 by the predetermined distance.

For example, referring to FIG. 15 together, the cam member 280 may move in the second axial direction D2 by a smaller one (min (h1, h2)) of a first protruding height h1 or a second protruding height h2. The moving cams 291 and 292 may move in the second axial direction D2 by the sum of the axial movement distance (min (h1, h2)) of the cam member 280 and a smaller one (min (h3, h4)) of a third protruding height h3 or a fourth protruding height h4. The sum (min (h1, h2)+min (h3, h4)) may be the maximum movement distance of the moving cams 291 and 292 and may be the maximum displacement of the elastic members 293 and 294. In other words, the elastic members 293 and 294 may be compressed to the maximum in the free-stop state. The compressed elastic members 293 and 294 may increase the frictional forces between the arm cams 253 and 263, the cam member 280, and the moving cams 291 and 292, and the increased frictional forces may provide torque capable of maintaining the hinge structure 200 in a specified state.

Referring to FIG. 16D, when the hinge structure 200 is changed from the free-stop state to the fully folded state, the arm shafts 251 and 261 may be rotated by rotation of the rotary structures 210 and 220 and the arms 250 and 260, and the arm cams 253 and 263 and the moving cams 291 and 292 may rotate together with the arm shafts 251 and 261. For example, the arm cams 253 and 263 and the moving cams 291 and 292 may move leftward in the illustrated cam profile. At this time, the first protruding portions 253a of the arm cams 253 and 263 may move toward the second recessed portions 281b of the cam member 280 along inclined surfaces of the cam member 280. The fourth protruding portions 291a of the moving cams 291 and 292 may move toward the third recessed portions 282b of the cam member 280 along inclined surfaces of the cam member 280. At this time, the elastic members 293 and 294 may be uncompressed, and the uncompressed elastic members 293 and 294 may apply elastic forces to the moving cams 291 and 292 in the first axial direction D1. Accordingly, the moving cams 291 and 292 and the cam member 280 may move in the first axial direction D1. For example, potential energy stored in the elastic members 293 and 294 may be converted into kinetic energy that moves the moving cams 291 and 292.

In the fully folded state of FIG. 16E, the first protruding portions 253a of the arm cams 253 and 263 may make contact with the second recessed portions 281b of the cam member 280, and the second protruding portions 281a of the cam member 280 may make contact with the first recessed portions 253b of the arm cams 253 and 263. The third protruding portions 282a of the cam member 280 may make contact with the fourth recessed portions 291b of the moving cams 291 and 292. The fourth protruding portions 291a of the moving cams 291 and 292 may make contact with the third recessed portions 282b of the cam member 280. The elastic members 293 and 294 may have a third length L3 greater than the second length L2. When the hinge structure 200 is in the fully folded state, the elastic members 293 and 294 may be uncompressed, as compared with when the hinge structure 200 is in the free-stop state. For example, in the fully folded state, the elastic members 293 and 294 may be less compressed than in the free-stop state.

In an embodiment, when the hinge structure 200 is changed from the free-stop state to the unfolded state, the arm cams 253 and 263 and the moving cams 291 and 292 may move rightward with respect to the cam profile, and when the hinge structure 200 is changed from the free-stop state to the fully folded state, the arm cams 253 and 263 and the moving cams 291 and 292 may move leftward with respect to the cam profile.

In an embodiment, when the hinge structure 200 is changed from the free-stop state to the unfolded state or the fully folded state, the intervals between the arm cams 253 and 263 and the moving cams 291 and 292 may be decreased, and the elastic members 293 and 294 may be uncompressed. The uncompressed elastic members 293 and 294 may press the moving cams 291 and 292 in the first axial direction D1. When the hinge structure 200 is changed from the free-stop state to the unfolded state or the fully folded state, potential energy stored in the elastic members 293 and 294 may be converted into kinetic energy to enable the hinge structure 200 to be rapidly changed to the unfolded state or the fully folded state. In an embodiment, when the hinge structure 200 is changed from the free-stop state to the unfolded state or the fully folded state, the kinetic energy may apply torque to the first housing 110 and the second housing 120 to enable the hinge structure 200 to be changed to the unfolded state or the fully folded state. Furthermore, the torque applied to the first housing 110 may rotate the first rotary structure 210, the first arm 250, and the first arm shaft 251, and the torque applied to the second housing 120 may rotate the second rotary structure 220, the second arm 260, and the second arm shaft 261.

In an embodiment, for a change from the unfolded state or the fully folded state to the free-stop state, the hinge structure 200 may require a relatively large force to compress the elastic members 293 and 294. That is, the hinge structure 200 in the unfolded state or the fully folded state may provide a detent function of maintaining the unfolded state or the fully folded state without being changed to the free-stop state (e.g., without being unfolded or folded) when a relatively smaller force than the force required to compress the elastic members 293 and 294 is applied. For example, in the fully folded state, the restoring force of the display 140 may act in the unfolding directions. The force for compressing the elastic members 293 and 294 may be greater than the restoring force of the display 140. Accordingly, an unfolding motion by the restoring force of the display 140 may be prevented. That is, the hinge structure 200 may remain in the fully folded state as long as the user does not unfold the hinge structure 200.

In an embodiment, forces required for the hinge structure 200 to perform an unfolding motion and a folding motion may differ from each other due to the restoring force of the display 140. For example, to change (fold) the hinge structure 200 from the unfolded state to the free-stop state, the user may apply a relatively large force to compress the elastic members 293 and 294 and cancel out the restoring force of the display 140. On the other hand, to change (unfold) the hinge structure 200 from the fully folded state to the free-stop state, the user may apply a relatively small force because the restoring force of the display 140 acts in the direction of compressing the elastic members 293 and 294.

For example, when a force sufficient to compress the elastic members 293 and 294 is not applied in the state of FIG. 16B or 16D, the hinge structure 200 may be returned to the unfolded state of FIG. 16A or the fully folded state of FIG. 16E by the elastic forces of the elastic members 293 and 294. That is, the hinge structure 200, when deviating from the free-stop state, may maintain the unfolded state or the fully folded state using the elastic forces of the elastic members 293 and 294.

The hinge structure 200 according to the embodiment may include the cam member 280 having the cams formed in the first axial direction D1 and the second axial direction D2, and thus friction areas of the cam structures may be increased. Surface pressures acting on the cam structures may be decreased by the increased friction areas. The surface pressures may be defined as the elastic forces of the elastic members 293 and 294 over the friction areas. Based on predetermined surface pressure, the hinge structure 200 may include elastic members 293 and 294 having a larger elastic modulus. Wear of the cam structures may be reduced by the decreased surface pressures. The hinge structure 200 according to the embodiment may include the cam member 280 having the cams 281, 282, 283, and 284 formed on the opposite surfaces thereof and may thus include two cam profiles that can be independently designed. Accordingly, operating characteristics (e.g., detent characteristics and free-stop characteristics) of the electronic device 100 and the hinge structure 200 may be more variously designed.

Figure 17A:
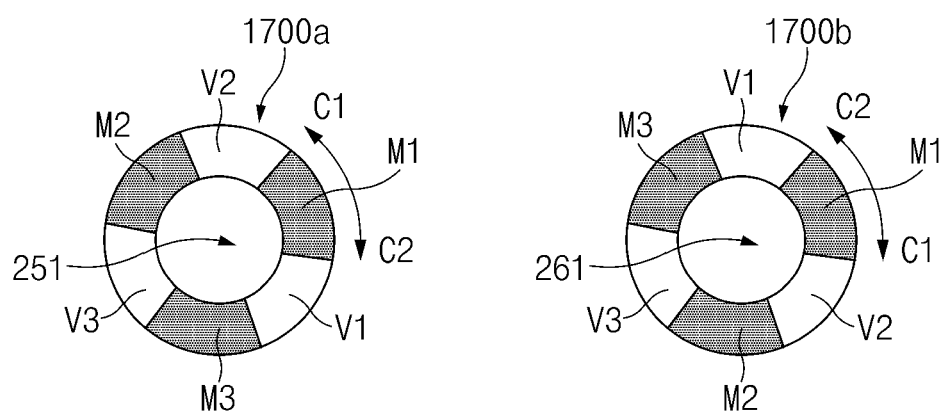
FIGS. 17A and 17B are diagrams illustrating an example of cams of the hinge structure according to various embodiments.
Figure 17B:
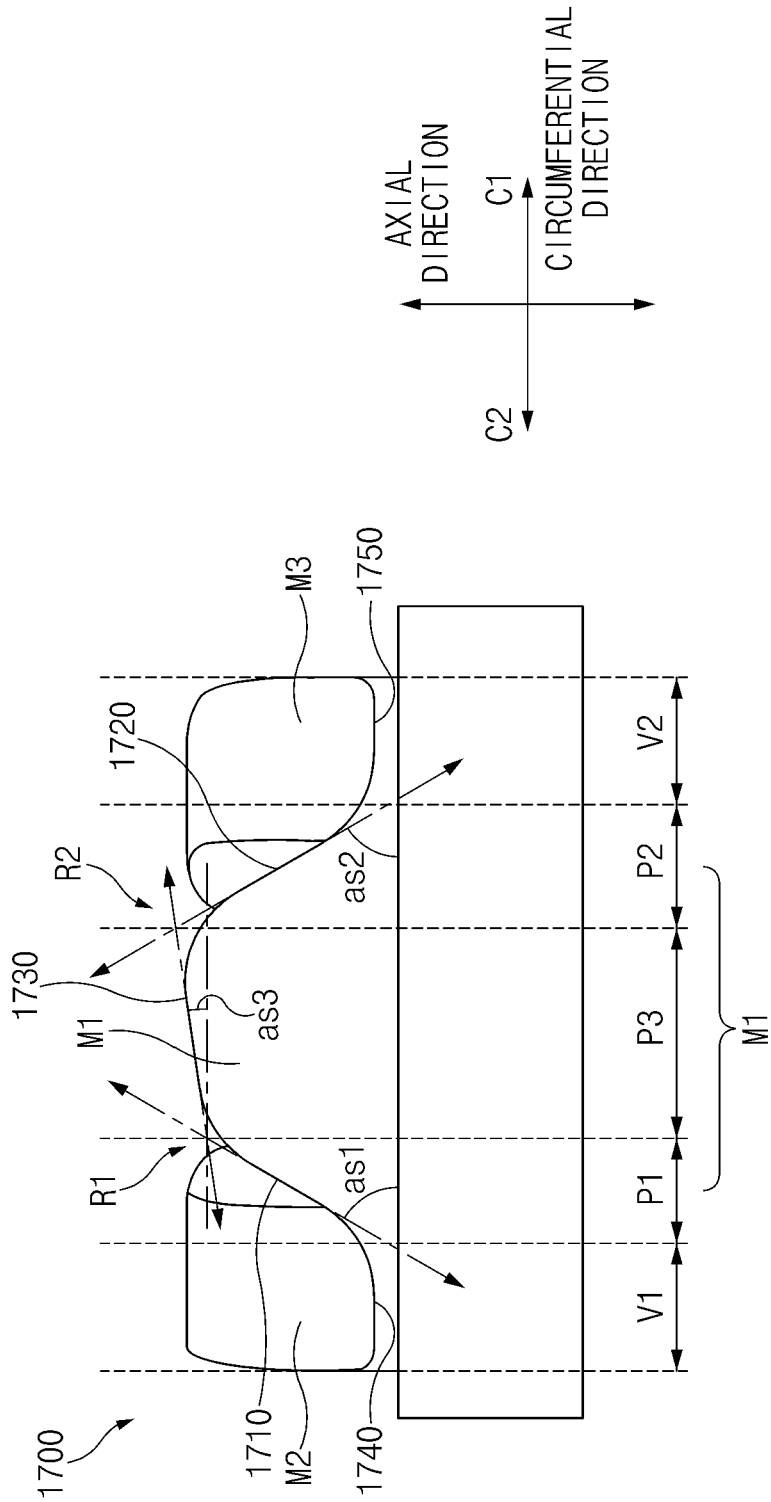

FIGS. 17A and 17B are diagrams illustrating an example of the cams of the hinge structure according to various embodiments.

Referring to FIG. 17A, a cam structure 1700 according to an embodiment may include a first cam structure 1700a coupled to the first arm shaft 251 and a second cam structure 1700b coupled to the second arm shaft 261. For example, the first cam structure 1700a illustrated may be at least one of the first arm cam 253, the first moving cam 291, the first cam 281 of the cam member 280, or the second cam 282 of the cam member 280. For example, the second cam structure 1700b illustrated may be at least one of the second arm cam 263, the second moving cam 292, the third cam 283 of the cam member 280, or the fourth cam 284 of the cam member 280.

Each of the first cam structure 1700a and the second cam structure 1700b may include a plurality of protruding portions M1, M2, and M3 and a plurality of recessed portions V1, V2, and V3. In FIG. 17A, each of the first cam structure 1700a and the second cam structure 1700b is illustrated as including three protruding portions M1, M2, and M3 and three recessed portions V1, V2, and V3. However, the disclosure is not limited thereto. For example, each of the first cam structure 1700a and the second cam structure 1700b may have a structure including two or more protruding portions and two or more recessed portions.

In an embodiment, the plurality of protruding portions M1, M2, and M3 may all have the same structure. Alternatively, at least one of the protruding portions M1, M2, and M3 may have a different form from the other protruding portions. In some embodiments, the plurality of protruding portions M1, M2, and M3 may include a protruding portion having a third inclination angle as3 illustrated in FIG. 17B and protruding portions (e.g., the protruding portions 253a, 281a, 282a, and 291a of FIG. 15) having a flat protruding surface.

In describing the illustrated embodiment, circumferential directions C1 and C2 whose centers are the arm shafts 251 and 261 having the cam structures 1700a and 1700b coupled thereto are defined. The circumferential directions C1 and C2 may be perpendicular to the axial direction. For example, in the first cam structure 1700a, the first circumferential direction C1 may be the counterclockwise direction and may be the right direction in FIG. 17B. In the first cam structure 1700a, the second circumferential direction C2 may be the clockwise direction and may be the left direction in FIG. 17B. For example, in the second cam structure 1700b, the first circumferential direction C1 may be the clockwise direction and may be the right direction in FIG. 17B. In the second cam structure 1700b, the second circumferential direction C2 may be the counterclockwise direction and may be the left direction in FIG. 17B.

The following description will be focused on the first protruding portion M1 among the plurality of protruding portions M1, M2, and M3.

In an embodiment, each of the first cam structure 1700a and the second cam structure 1700b may include the first protruding portion M1, the first recessed portion V1, and the second recessed portion V2. Referring to the drawing, the first recessed portion V1 may be formed on one side of the first protruding portion M1 in the circumferential direction C, and the second recessed portion V2 may be formed on an opposite side of the first protruding portion M1 in the circumferential direction C. In an embodiment, the first protruding portion M1 may include a first portion P1 including a first inclined surface 1710, a second portion P2 including a second inclined surface 1720, and a third portion P3 including a third inclined surface 1730.

In an embodiment, the first inclined surface 1710, when viewed in the first circumferential direction C1, may extend from a first recessed surface 1740 of the first recessed portion V1 to a protruding surface of the first protruding portion M1. For example, the first inclined surface 1710 may extend obliquely upward from the first recessed surface 1740 when viewed in the first circumferential direction C1 and may extend obliquely downward from the protruding surface of the first protruding portion M1 when viewed in the second circumferential direction C2. In an embodiment, the first inclined surface 1710 may have a first inclination angle as1 with respect to the circumferential direction C. In various embodiments, the first inclination angle as1 may differ from a second inclination angle as2.

In an embodiment, the second inclined surface 1720, when viewed in the first circumferential direction C1, may extend from the protruding surface of the first protruding portion M1 to a second recessed surface 1750 of the second recessed portion V2. For example, the second inclined surface 1720 may extend obliquely downward from the protruding surface of the first protruding portion M1 when viewed in the first circumferential direction C1 and may extend obliquely upward from the second recessed surface 1750 when viewed in the second circumferential direction C2. In an embodiment, the second inclined surface 1720 may have the second inclination angle as2 with respect to the circumferential direction C. In various embodiments, the second inclination angle as2 may differ from the first inclination angle as1.

In an embodiment, the protruding surface of the first protruding portion M1 may include the third inclined surface 1730. The third inclined surface 1730 may extend from the first inclined surface 1710 to the second inclined surface 1720 when viewed in the first circumferential direction C1. For example, the third inclined surface 1730 may extend obliquely upward from the first inclined surface 1710 when viewed in the first circumferential direction C1 and may extend obliquely downward from the second inclined surface 1720 when viewed in the second circumferential direction C2. In an embodiment, the third inclined surface 1730 may have the third inclination angle as3 with respect to the circumferential direction C. For example, the absolute value of the third inclination angle as3 may be smaller than the absolute value of the first inclination angle as1 and the absolute value of the second inclination angle as2.

In various embodiments, the first inclination angle as1, the second inclination angle as2, and the third inclination angle as3 may include an acute angle smaller than 90 degrees with respect to the circumferential direction C.

In various embodiments, the first inclined surface 1710 and the third inclined surface 1730 may be connected by a round surface having a first curvature. The second inclined surface 1720 and the third inclined surface 1730 may be connected by a round surface having a second curvature. For example, the protruding surface of the first protruding portion M1 may further include rounded areas formed on opposite sides of the third inclined surface 1730.

Figure 18A:
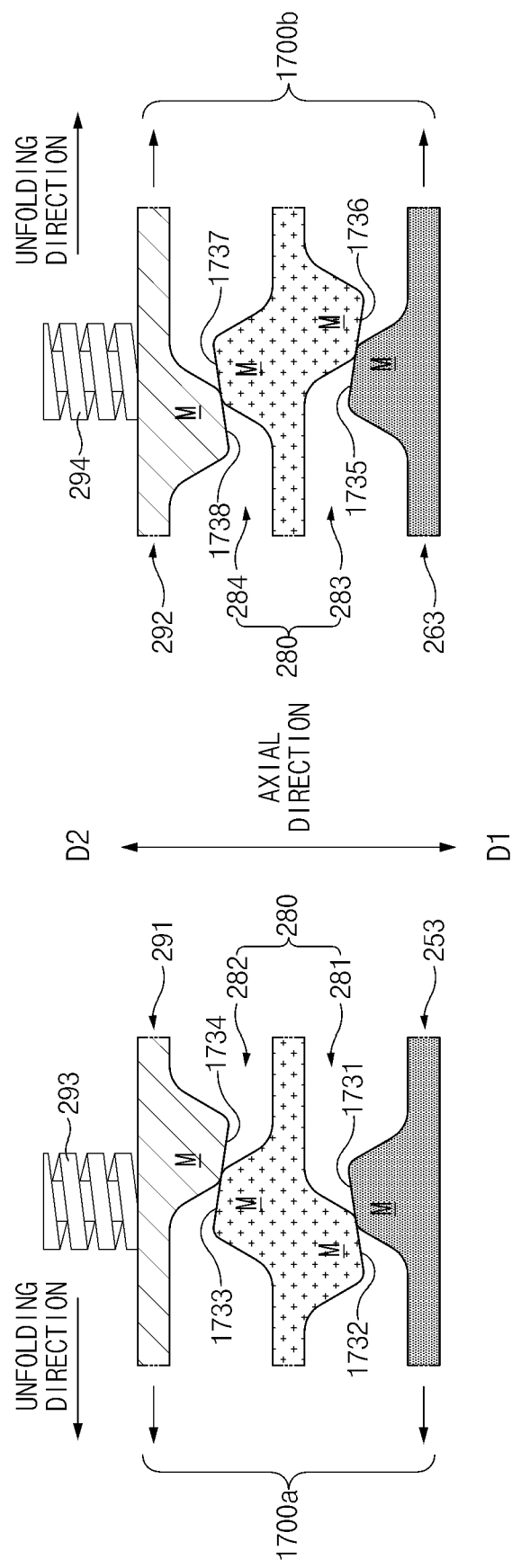
FIGS. 18A and 18B are diagrams illustrating profiles of first cam structures and second cam structures of the hinge structure according to various embodiments.
Figure 18B:
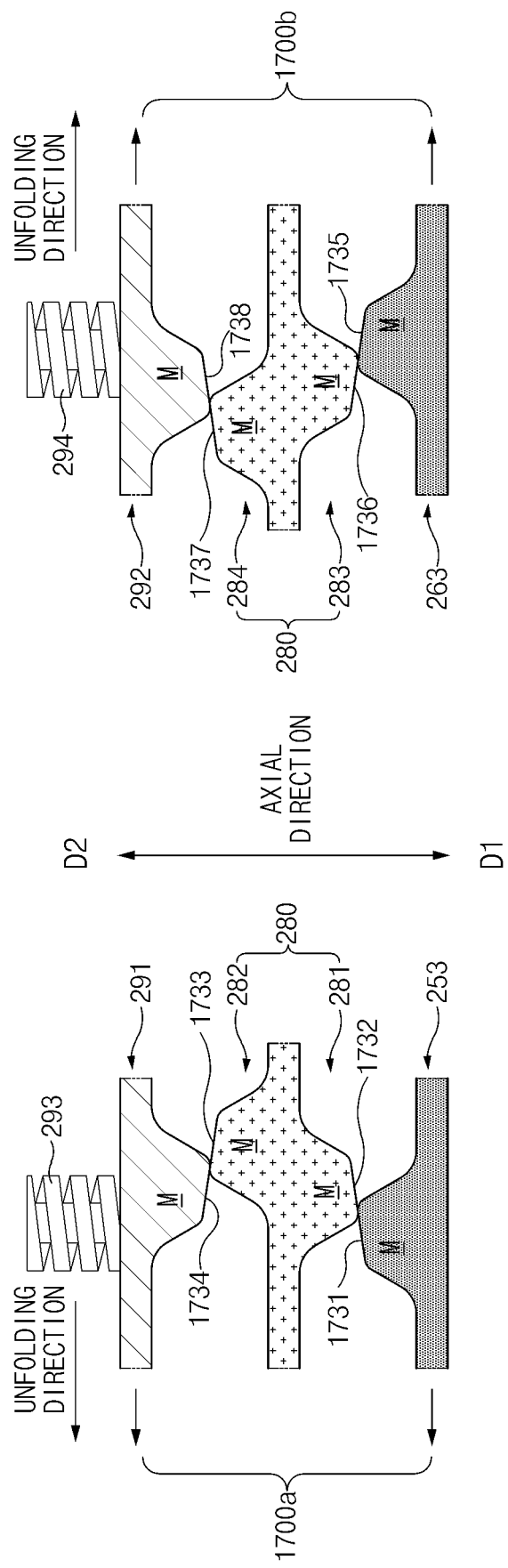

FIGS. 18A and 18B are diagrams illustrating profiles of the first cam structures and the second cam structures of the hinge structure according to various embodiments. FIGS. 18A and 18B are diagrams illustrating a case in which the hinge structure is in a free-stop state. For example, at least one of the cam structures illustrated in FIGS. 18A and 18B may include the cam illustrated in FIGS. 17A and 17B.

The first cam structures 1700a illustrated may be structures coupled to or located on the first arm shaft 251 and may include a first arm cam 253, a first cam 281 and a second cam 282 of a cam member 280, and a first moving cam 291. The second cam structures 1700b illustrated may be structures coupled to or located on the second arm shaft 261 and may include a second arm cam 263, a third cam 283 and a fourth cam 284 of the cam member 280, and a second moving cam 292.

The directions in which the arm shafts 251 and 261 rotate when the electronic device 100 and/or the hinge structure 200 is unfolded and the directions in which the arm cams 253 and 263 and the moving cams 291 and 292 move when viewed in the profiles may be defined as the unfolding directions.

For example, referring to FIGS. 8A, 8B and 8C together, when the electronic device 100 and/or the hinge structure 200 is unfolded, the first arm cam 253 and the first moving cam 291 may rotate in the clockwise direction together with the first arm shaft 251, and the first arm cam 253 and the first moving cam 291 may move leftward in the illustrated profiles. Furthermore, the cam member 280 and the first moving cam 291 may linearly move in the axial direction.

For example, referring to FIGS. 8A, 8B and 8C together, when the electronic device 100 and/or the hinge structure 200 is unfolded, the second arm cam 263 and the second moving cam 292 may rotate in the counterclockwise direction together with the second arm shaft 261, and the second arm cam 263 and the second moving cam 292 may move rightward in the illustrated profiles. Furthermore, the cam member 280 and the second moving cam 292 may linearly move in the axial direction.

The electronic device 100 and/or the hinge structure 200 may include a free-stop section. The free-stop section may be defined to include a first free-stop state illustrated in FIG. 18A, a second free-stop state illustrated in FIG. 18B, and a state between the first free-stop state and the second free-stop state. For example, the first free-stop state may be the state in which the electronic device 100 and/or the hinge structure 200 enters the free-stop section from a fully folded state, and the second free-stop state may be the state in which the electronic device 100 and/or the hinge structure 200 exits the free-stop section. The second free-stop state may be the state in which the electronic device 100 and/or the hinge structure 200 is unfolded from the first free-stop state.

The restoring force of the display 140 may be applied to the electronic device 100 and/or the hinge structure 200 in a folded state (e.g., FIG. 2B or 2C). The restoring force of the display 140 may be a force by which a curved area (e.g., the folding area 143 of FIGS. 2B and 2C) returns to a flat area. That is, the restoring force of the display 140 may act in the unfolding directions. The restoring force of the display 140 may be increased as the electronic device 100 and/or the hinge structure 200 approaches to the fully folded state. The restoring force of the display 140 may be increased as the thickness or area of the display 140 is increased.

For example, due to the restoring force, an electronic device including a large display may perform an unfolding motion not intended by a user. For example, the electronic device 100 and/or the hinge structure 200 may be unfolded without maintaining the free-stop state. To solve this problem, the hinge structure 200 and/or the electronic device 100 according to the embodiment may be configured such that a larger force than the restoring force of the display 140 is required when an unfolding motion is performed in the free-stop section.

Protruding portions M of the first cam structures 1700a may make surface-to-surface contact with each other in the free-stop section. The protruding portions M of the first cam structures 1700a may include third inclined surfaces (e.g., the third inclined surface 1730 of FIG. 17) that make surface-to-surface contact with each other in the free-stop section. For example, the first arm cam 253, the first cam 281, the second cam 282, and the first moving cam 291 may include inclined surface 1731, inclined surface 1732, inclined surface 1733, and inclined surface 1734, respectively.

The third inclined surfaces 1731, 1732, 1733, and 1734 included in the first cam structures 1700a may be obliquely formed in the direction in which the first elastic member 293 is further compressed when the unfolding motion is performed in the free-stop section. For example, the first arm cam 253 and the first moving cam 291 may move in the left direction that is the unfolding direction, and as the first arm cam 253 and the first moving cam 291 move leftward, the first moving cam 291 and the cam member 280 may move in the second axial direction D2, and the first elastic member 293 may be compressed.

For example, inclined surface 1731 of the first arm cam 253 may be inclined in the first axial direction D1 along the unfolding direction. For example, inclined surface 1732 of the first cam 281 of the cam member 280 may be inclined in the first axial direction D1 when viewed in the unfolding direction. For example, inclined surface 1733 of the second cam 282 of the cam member 282 may be inclined in the second axial direction D2 when viewed in the unfolding direction. For example, inclined surface 1734 of the first moving cam 291 may be inclined in the second axial direction D2 along the unfolding direction.

In an embodiment, the third inclined surfaces 1731 and 1734 of the first arm cam 253 and the first moving cam 291, which rotate together with the first arm shaft 251, may be inclined to have a decreasing protruding height along the unfolding direction in the free-stop section. In an embodiment, the inclined surfaces 1732 and 1733 of the first cam 281 and the second cam 282, which do not rotate together with the first arm shaft 251, may be inclined to have an increasing protruding height in the free-stop section when viewed in the unfolding direction.

In an embodiment, the first elastic member 293 may be compressed to have a first length in the first free-stop state and may be compressed to have a second length smaller than the first length in the second free-stop state. The first elastic member 293 may be gradually compressed as the unfolding motion (e.g., the movement of the first arm cam 253 and the first moving cam 291 to the left) is performed in the free-stop section.

Although the first cam structures 1700a engaged with each other are illustrated as having the third inclined surfaces 1731, 1732, 1733, and 1734 in corresponding shapes, the shapes of the first cam structures 1700a of the hinge structure 200 according to the embodiment are not necessarily limited thereto. For example, one of the protruding portion M of the first arm cam 253 and the protruding portion M of the first cam 281 of the cam member 280, which are engaged with each other, may include the third inclined surface 1731 or 1732, and the other may include a flat protruding surface (e.g., FIG. 15). For example, one of the protruding portion M of the second cam 282 of the cam member 280 and the protruding portion M of the first moving cam 291, which are engaged with each other, may include the third inclined surface 1733 or 1734, and the other may include a flat protruding surface (e.g., FIG. 15).

Protruding portions M of the second cam structures 1700b may make surface-to-surface contact with each other in the free-stop section. The protruding portions M of the second cam structures 1700b may include third inclined surfaces (e.g., the third inclined surface 1730 of FIG. 17) that make surface-to-surface contact with each other in the free-stop section. For example, the second arm cam 263, the third cam 283, the fourth cam 284, and the second moving cam 292 may include inclined surface 1735, inclined surface 1736, inclined surface 1737, and inclined surface 1738, respectively.

The third inclined surfaces 1735, 1736, 1737, and 1738 included in the second cam structures 1700b may be obliquely formed in the direction in which the second elastic member 294 is further compressed when the unfolding motion is performed in the free-stop section. For example, the second arm cam 263 and the second moving cam 292 may move in the right direction that is the unfolding direction, and as the second arm cam 263 and the second moving cam 292 move rightward, the second moving cam 292 and the cam member 280 may move in the second axial direction D2, and the second elastic member 294 may be compressed.

For example, inclined surface 1735 of the second arm cam 263 may be inclined in the first axial direction D1 along the unfolding direction. For example, inclined surface 1736 of the third cam 283 of the cam member 280 may be inclined in the first axial direction D1 when viewed in the unfolding direction. For example, inclined surface 1737 of the fourth cam 284 of the cam member 280 may be inclined in the second axial direction D2 when viewed in the unfolding direction. For example, inclined surface 1738 of the second moving cam 292 may be inclined in the second axial direction D2 along the unfolding direction.

In an embodiment, the third inclined surfaces 1735 and 1738 of the second arm cam 263 and the second moving cam 292, which rotate together with the second arm shaft 261, may be inclined to have a decreasing protruding height along the unfolding direction in the free-stop section. In an embodiment, the third inclined surfaces 1736 and 1737 of the third cam 283 and the fourth cam 284, which do not rotate together with the second arm shaft 261, may be inclined to have an increasing protruding height in the free-stop section when viewed in the unfolding direction.

In an embodiment, the second elastic member 294 may be compressed to have the first length in the first free-stop state and may be compressed to have the second length smaller than the first length in the second free-stop state. The second elastic member 294 may be gradually compressed as the unfolding motion (e.g., the movement of the second arm cam 263 and the second moving cam 292 to the right) is performed in the free-stop section.

Although the second cam structures 1700b engaged with each other are illustrated as having the third inclined surfaces 1735, 1736, 1737, and 1738 in corresponding shapes, the shapes of the second cam structures 1700b of the hinge structure 200 according to the embodiment are not necessarily limited thereto. For example, one of the protruding portion M of the second arm cam 263 and the protruding portion M of the third cam 283 of the cam member 280, which are engaged with each other, may include the third inclined surface 1735 or 1736, and the other may include a flat protruding surface (e.g., FIG. 15). For example, one of the protruding portion M of the fourth cam 284 of the cam member 280 and the protruding portion M of the second moving cam 292, which are engaged with each other, may include the third inclined surface 1737 or 1738, and the other may include a flat protruding surface (e.g., FIG. 15).

In an embodiment, the hinge structure 200 may be configured such that in the free-stop section, a force required to perform an unfolding motion is greater than a force required to perform a folding motion. For example, referring to the drawing, the unfolding directions in the free-stop section may correspond to the direction in which the elastic members 293 and 294 are compressed, and the folding directions in the free-stop section may correspond to the direction in which the elastic members 293 and 294 are uncompressed. At this time, the force required to perform the folding motion may be greater than the restoring force of the display 140. Accordingly, even when the restoring force of the display 140 is applied to the electronic device 100 and the hinge structure 200 in the unfolding directions, the elastic members 293 and 294 may not be compressed by the restoring force, and the electronic device 100 and the hinge structure 200 may maintain an arbitrary state included in the free-stop section.

As described above, considering that the restoring force of the display 140 is applied in the unfolding directions, the hinge structure 200 according to the embodiment may include the third inclined surface 1730 such that the elastic members 293 and 294 are compressed during an unfolding motion in the free-stop section. Accordingly, an unfolding motion not intended by a user may be prevented from being performed by the restoring force of the display 140.

An electronic device according to various example embodiments of the disclosure may include: a housing including a first housing and a second housing, a display extending from the first housing to the second housing, and a hinge structure comprising a hinge connected to the first housing and the second housing. The hinge structure may include: a fixed portion, a first rotary portion rotatably coupled to the fixed portion to be rotatable about a first axis of rotation and connected to the first housing, a second rotary portion rotatably coupled to the fixed portion to be rotatable about a second axis of rotation and connected to the second housing 120, the first axis of rotation and the second axis of rotation extending parallel to an axial direction, a first arm shaft rotatably coupled to the fixed portion and parallel to the axial direction, a second arm shaft rotatably coupled to the fixed portion and parallel to the axial direction, a first arm coupled to the first arm shaft configured to rotate together with the first arm shaft including a first arm cam formed around the first arm shaft, a second arm coupled to the second arm shaft configured to rotate together with the second arm shaft and including a second arm cam formed around the second arm shaft, a first elastic member coupled to the first arm shaft and configured to apply an elastic force in the axial direction, a second elastic member coupled to the second arm shaft and configured to apply an elastic force in the axial direction, a first moving cam coupled to the first arm shaft configured to linearly move in the axial direction and rotate about the axial direction, the first moving cam being supported by the first elastic member and located between the first elastic member and the first arm cam, a second moving cam coupled to the second arm shaft configured to linearly move in the axial direction and rotate about the axial direction, the second moving cam being supported by the second elastic member and located between the second elastic member and the second arm cam, and a cam 280 coupled to the first arm shaft and the second arm shaft configured to linearly move in the axial direction. The cam may include a first portion through which the first arm shaft passes and including a first cam engaged with the first arm cam and a second cam engaged with the first moving cam, a second portion through which the second arm shaft passes including a third cam engaged with the second arm cam and a fourth cam engaged with the second moving cam, and a connecting portion connecting the first portion and the second portion.

In various example embodiments, the first arm may include a first sliding pin at least partially accommodated in a first sliding groove formed in the first rotary portion. The first sliding pin may slide along the first sliding groove when the first arm and the first rotary portion rotate about the first arm 251 and the first axis of rotation, respectively. The second arm may include a second sliding pin at least partially accommodated in a second sliding groove formed in the second rotary portion. The second sliding pin may slide along the second sliding groove when the second arm and the second rotary structure rotate about the second arm shaft and the second axis of rotation R2, respectively.

In various example embodiments, the fixed portion may include a first guide rail in which a first guide portion of the first rotary portion is accommodated and a second guide rail in which a second guide portion of the second rotary structure is accommodated. The first guide rail may include a rail having a circular arc shape whose center is the first axis of rotation, and the second guide rail may include a rail having a circular arc shape whose center is the second axis of rotation.

In various example embodiments, the first arm shaft and the second arm shaft may include a first shaft portion having a polygonal cross-section perpendicular to the axial direction. The first arm, the first portion of the cam, the first moving cam, and the first elastic member may be coupled to the first shaft portion of the first arm shaft, and the second arm, the second portion of the cam, the second moving cam, and the second elastic member may be coupled to the first shaft portion S1 of the second arm shaft.

In various example embodiments, the cross-section of the first shaft portion may include a straight section.

In various example embodiments, the first arm may be at least partially press-fit onto the first shaft portion of the first arm shaft, and the second arm may be at least partially press-fit onto the first shaft portion of the second arm shaft.

In various example embodiments, the first portion of the cam may have a first through-hole formed therein through which the first arm shaft passes, and the first through-hole may have a cross-section larger than the cross-section of the first shaft portion of the first arm shaft. The second portion of the cam may have a second through-hole formed therein through which the second arm shaft passes, and the second through-hole may have a cross-section larger than the cross-section of the first shaft portion of the second arm shaft. The first arm shaft and the second arm shaft may be configured to rotate in a state of being inserted into the first through-hole and the second through-hole, respectively. The cam may be configured to move in the axial direction in a state in which the first arm shaft and the second arm shaft pass through the cam.

In various example embodiments, the first moving cam may have a third through-hole formed therein through which the first shaft portion of the first arm shaft passes, and the third through-hole may have a cross-section corresponding to the cross-section of the first shaft portion. The second moving cam may have a fourth through-hole formed therein through which the first shaft portion of the second arm shaft passes, and the fourth through-hole may have a cross-section corresponding to the cross-section of the first shaft portion. The first moving cam may be configured to rotate together with the first arm shaft and may be configured to move in the axial direction along the first arm shaft, and the second moving cam may rotate together with the second arm shaft and may move in the axial direction along the second arm shaft.

In various example embodiments, the first arm and the second arm, when viewed in the axial direction, may be configured to rotate in a state of being fixed to specified positions on the first arm shaft and the second arm shaft, respectively. The cam may linearly move in the axial direction along the first arm shaft and the second arm shaft. The first moving cam and the second moving cam may be configured to rotate together with the first arm shaft and the second arm shaft and may be configured to linearly move in the axial direction along the first arm shaft and the second arm shaft, respectively.

In various example embodiments, the hinge structure may further include a fixing portion through which the first arm shaft and the second arm shaft pass. The first elastic member may be compressed between the first moving cam and the fixing portion when the first moving cam and the cam move toward the first elastic member. The second elastic member may be compressed between the second moving cam and the fixing member when the second moving cam and the cam move toward the second elastic member.

In various example embodiments, the hinge structure may further include a gear. The gear may include a first gear formed on the first arm shaft, a second gear formed on the second arm shaft, and a connecting gear connecting the first gear and the second gear. The first arm shaft and the second arm shaft may be configured to rotate in opposite directions by a same angle.

In various example embodiments, the first arm cam and the second arm cam may include first protruding portions protruding toward the cam, respectively. The first cam and the third cam of the cam may include second protruding portions protruding toward the first arm cam and the second arm cam, respectively. The second cam and the fourth cam of the cam may include third protruding portions protruding toward the first moving cam and the second moving cam, respectively. The first moving cam and the second moving cam may include fourth protruding portions protruding toward the cam, respectively. The first protruding portions and the fourth protruding portions may be configured to move relative to the second protruding portions and the third protruding portions when the first arm shaft and the second arm shaft rotate.

In various example embodiments, the first arm cam, the second arm cam, the first moving cam, and the second moving cam may be disposed such that the first protruding portions and the fourth protruding portions are spaced apart from each other by a first angle. The cam may be formed such that the second protruding portions and the third protruding portions are spaced apart from each other by a second angle substantially the same as the first angle. The cam may be configured such that the third protruding portions make surface-to-surface contact with the fourth protruding portions when the first protruding portions make surface-to-surface contact with the second protruding portions.

In various example embodiments, the first protruding portions may protrude toward one side along the axial direction by a first height, the second protruding portions may protrude toward an opposite side along the axial direction by a second height, the third protruding portions may protrude toward the one side along the axial direction by a third height, and the fourth protruding portions may protrude toward the opposite side along the axial direction by a fourth height. The cam may be movable in the axial direction by a smaller one of the first height or the second height. The first moving cam and the second moving cam may be movable in the axial direction by the sum of a smaller one of the third height or the fourth height and a smaller one of the first height or the second height. The first elastic member and the second elastic member may be compressed or uncompressed by distances that the first moving cam 291 and the second moving cam move in the axial direction, respectively.

In various example embodiments, at least one of a protruding portion of the first arm cam or a protruding portion of the first cam of the cam may include an inclined surface obliquely formed in a direction in which the first elastic member is further compressed, such that the hinge structure is unfolded in a state in which the protruding portion of the first arm cam and the protruding portion of the first cam make contact with each other. At least one of a protruding portion of the first moving cam or a protruding portion of the second cam of the cam may include an inclined surface obliquely formed in a direction in which the first elastic member is further compressed, such that the hinge structure is unfolded in a state in which the protruding portion of the first moving cam and the protruding portion of the second cam make contact with each other. At least one of a protruding portion of the second arm cam or a protruding portion of the third cam of the cam may include an inclined surface obliquely formed in a direction in which the second elastic member is further compressed, such that the hinge structure is unfolded in a state in which the protruding portion of the second arm cam and the protruding portion of the third cam make contact with each other. At least one of a protruding portion of the second moving cam or a protruding portion of the fourth cam of the cam may include an inclined surface obliquely formed in a direction in which the second elastic member is further compressed, such that the hinge structure is unfolded in a state in which the protruding portion of the second moving cam and the protruding portion of the fourth cam make contact with each other.

In various example embodiments, the first housing may include a first edge parallel to the axial direction, and the second housing may include a second edge parallel to the axial direction. The display may include a first area at least partially disposed in the first housing and formed to be flat, a second area at least partially disposed in the second housing and formed to be flat, and a folding area formed between the first area and the second area and deformable to be flat or curved. The electronic device may include an unfolded state in which the folding area is flat and a folded state in which the folding area is curved. The folded state may include a fully folded state in which the first edge and the second edge make contact with each other and a free-stop state between the unfolded state and the fully folded state. The free-stop state may include a state in which the first protruding portions and the second protruding portions make surface-to-surface contact with each other and the third protruding portions and the fourth protruding portions make surface-to-surface contact with each other.

In various example embodiments, the first elastic member and the second elastic member may be more compressed in the free-stop state than in the unfolded state.

In various example embodiments, in the unfolded state or the fully folded state, the first protruding portions may be located in second recessed portions between the second protruding portions, and the third protruding portions may be located in fourth recessed portions between the fourth protruding portions.

In various example embodiments, the cam, the first moving cam, and the second moving cam may be configured to move away from the first arm cam and the second arm cam to compress the first elastic member and the second elastic member when the electronic device is changed from the fully folded state or the unfolded state to the free-stop state, and may be configured to move toward the first arm cam and the second arm cam when the electronic device is changed from the free-stop state to the fully folded state or the unfolded state.

A hinge structure included in a foldable electronic device may include: a first arm shaft extending in an axial direction, a first arm coupled to the first arm shaft configured to rotate together with the first arm shaft and including a first arm cam formed around the first arm shaft, a first moving cam coupled to the first arm shaft configured to rotate together with the first arm shaft and to linearly move in the axial direction along the first arm shaft, a first elastic member coupled to the first arm shaft and configured to be compressed or uncompressed depending on a movement of the first moving cam, a second arm shaft extending in the axial direction, a second arm coupled to the second arm shaft configured to rotate together with the second arm shaft and including a second arm cam formed around the second arm shaft, a second moving cam coupled to the second arm shaft configured to rotate together with the second arm shaft and to linearly move in the axial direction along the second arm shaft, a second elastic member coupled to the second arm shaft and configured to be compressed or uncompressed depending on a movement of the second moving cam, and a cam configured to linearly move in the axial direction along the first arm shaft and the second arm shaft, the cam including a first portion through which the first arm shaft passes, a second portion through which the second arm shaft passes, and a connecting portion that connects the first portion and the second portion. The first portion of the cam may include a first cam engaged with the first arm cam and a second cam engaged with the first moving cam, and the second portion of the cam may include a third cam engaged with the second arm cam and a fourth cam engaged with the second moving cam. First protruding portions of the first arm cam and the second arm cam may be spaced apart from fourth protruding portions of the first moving cam and the second moving cam by a first angle. The cam may be formed such that second protruding portions of the first cam 281 and the third cam are spaced apart from third protruding portions of the second cam and the fourth cam by a second angle. The first angle may be equal to the second angle.

The electronic device according to the various embodiments of the disclosure may include the hinge structure that provides torque greater than or equal to the restoring force of the display. Accordingly, a folding motion of the foldable electronic device or a folded state desired by a user may be stably maintained.

Furthermore, the hinge structure according to various embodiments of the disclosure may provide torque sufficient to cancel out the restoring force of the display without an increase in the thickness of the electronic device.

In addition, the disclosure may provide various effects that are directly or indirectly recognized.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:
   a housing including a first housing and a second housing;
   a display extending from the first housing to the second housing; and
   a hinge structure comprising a hinge connected to the first housing and the second housing,
   wherein the hinge structure includes:
   a fixed portion;
   a first rotary portion coupled to the fixed structure to be rotatable about a first axis of rotation and connected to the first housing;
   a second rotary portion coupled to the fixed structure to be rotatable about a second axis of rotation and connected to the second housing, wherein the first axis of rotation and the second axis of rotation extend parallel to an axial direction;
   a first arm shaft rotatably coupled to the fixed portion and parallel to the axial direction;
   a second arm shaft rotatably coupled to the fixed portion and parallel to the axial direction;
   a first arm coupled to the first arm shaft configured to rotate together with the first arm shaft, the first arm including a first arm cam formed around the first arm shaft;

a second arm coupled to the second arm shaft configured to rotate together with the second arm shaft, the second arm including a second arm cam formed around the second arm shaft;
a first elastic member coupled to the first arm shaft and configured to apply an elastic force in the axial direction;
a second elastic member coupled to the second arm shaft and configured to apply an elastic force in the axial direction;
a first moving cam coupled to the first arm shaft configured to linearly move in the axial direction and rotate about the axial direction, the first moving cam being supported by the first elastic member and located between the first elastic member and the first arm cam;
a second moving cam coupled to the second arm shaft configured to linearly move in the axial direction and rotate about the axial direction, the second moving cam being supported by the second elastic member and located between the second elastic member and the second arm cam; and
a cam coupled to the first arm shaft and the second arm shaft configured to linearly move in the axial direction, and
wherein the cam includes:
a first portion through which the first arm shaft passes, the first portion including a first cam engaged with the first arm cam and a second cam engaged with the first moving cam;
a second portion through which the second arm shaft passes, the second portion including a third cam engaged with the second arm cam and a fourth cam engaged with the second moving cam; and
a connecting portion connecting the first portion and the second portion.

2. The electronic device of claim 1, wherein the first arm includes a first sliding pin at least partially accommodated in a first sliding groove formed in the first rotary structure,
wherein the first sliding pin is configured to slide along the first sliding groove when the first arm and the first rotary structure rotate about the first arm shaft and the first axis of rotation, respectively,
wherein the second arm includes a second sliding pin at least partially accommodated in a second sliding groove formed in the second rotary structure, and
wherein the second sliding pin is configured to slide along the second sliding groove when the second arm and the second rotary structure rotate about the second arm shaft and the second axis of rotation, respectively.

3. The electronic device of claim 1, wherein the fixed portion includes a first guide rail in which a first guide portion of the first rotary structure is accommodated and a second guide rail in which a second guide portion of the second rotary structure is accommodated,
wherein the first guide rail includes a rail having a circular arc shape whose center is the first axis of rotation, and
wherein the second guide rail includes a rail having a circular arc shape whose center is the second axis of rotation.

4. The electronic device of claim 1, wherein the first arm shaft and the second arm shaft include a first shaft portion having a polygonal cross-section perpendicular to the axial direction,
wherein the first arm, the first portion of the cam, the first moving cam, and the first elastic member are coupled to the first shaft portion of the first arm shaft, and wherein the second arm, the second portion of the cam, the second moving cam, and the second elastic member are coupled to the first shaft portion of the second arm shaft.

5. The electronic device of claim 4, wherein the cross-section of the first shaft portion includes a straight section.

6. The electronic device of claim 4, wherein the first arm is at least partially press-fit onto the first shaft portion of the first arm shaft, and
wherein the second arm is at least partially press-fit onto the first shaft portion of the second arm shaft.

7. The electronic device of claim 4, wherein the first portion of the cam includes a first through-hole formed therein through which the first arm shaft passes, the first through-hole having a cross-section larger than a cross-section of the first shaft portion of the first arm shaft,
wherein the second portion of the cam includes a second through-hole formed therein through which the second arm shaft passes, the second through-hole having a cross-section larger than a cross-section of the first shaft portion of the second arm shaft,
wherein the first arm shaft and the second arm shaft are configured to rotate in a state of being inserted into the first through-hole and the second through-hole, respectively, and
wherein the cam is configured to move in the axial direction in a state in which the first arm shaft and the second arm shaft pass through the cam member.

8. The electronic device of claim 4, wherein the first moving cam includes a third through-hole formed therein through which the first shaft portion of the first arm shaft passes, the third through-hole having a cross-section corresponding to a cross-section of the first shaft portion,
wherein the second moving cam includes a fourth through-hole formed therein through which the first shaft portion of the second arm shaft passes, the fourth through-hole having a cross-section corresponding to the cross-section of the first shaft portion,
wherein the first moving cam is configured to rotate together with the first arm shaft and to move in the axial direction along the first arm shaft, and
wherein the second moving cam is configured to rotate together with the second arm shaft and to move in the axial direction along the second arm shaft.

9. The electronic device of claim 4, wherein the first arm and the second arm, when viewed in the axial direction, are configured to rotate in a state of being fixed to specified positions on the first arm shaft and the second arm shaft, respectively,
wherein the cam is configured to move linearly in the axial direction along the first arm shaft and the second arm shaft, and
wherein the first moving cam and the second moving cam are configured to rotate together with the first arm shaft and the second arm shaft and to move linearly in the axial direction along the first arm shaft and the second arm shaft, respectively.

10. The electronic device of claim 1, wherein the hinge structure further includes a fixing portion through which the first arm shaft and the second arm shaft pass,
wherein the first elastic member is configured to be compressed between the first moving cam and the fixing member when the first moving cam and the cam member move toward the first elastic member, and
wherein the second elastic member is configured to be compressed between the second moving cam and the fixing member when the second moving cam and the cam member move toward the second elastic member.

11. The electronic device of claim 1, wherein the hinge structure further includes a gear,
wherein the gear includes a first gear formed on the first arm shaft, a second gear formed on the second arm shaft, and a connecting gear connecting the first gear and the second gear, and
wherein the first arm shaft and the second arm shaft rotate in opposite directions by a same angle.

12. The electronic device of claim 1, wherein the first arm cam and the second arm cam include first protruding portions protruding toward the cam, respectively,
wherein the first cam and the third cam of the cam include second protruding portions protruding toward the first arm cam and the second arm cam, respectively,
wherein the second cam and the fourth cam of the cam include third protruding portions protruding toward the first moving cam and the second moving cam, respectively,
wherein the first moving cam and the second moving cam include fourth protruding portions protruding toward the cam member, respectively, and
wherein the first protruding portions and the fourth protruding portions are configured to move relative to the second protruding portions and the third protruding portions when the first arm shaft and the second arm shaft rotate.

13. The electronic device of claim 12, wherein the first arm cam, the second arm cam, the first moving cam, and the second moving cam are disposed such that the first protruding portions and the fourth protruding portions are spaced apart from each other by a first angle,
wherein the cam is formed such that the second protruding portions and the third protruding portions are spaced apart from each other by a second angle substantially the same as the first angle, and
wherein the cam is configured such that the third protruding portions make surface-to-surface contact with the fourth protruding portions when the first protruding portions make surface-to-surface contact with the second protruding portions.

14. The electronic device of claim 12, wherein the first protruding portions protrude toward one side along the axial direction by a first height,
wherein the second protruding portions protrude toward an opposite side along the axial direction by a second height,
wherein the third protruding portions protrude toward the one side along the axial direction by a third height,
wherein the fourth protruding portions protrude toward the opposite side along the axial direction by a fourth height,
wherein the cam is movable in the axial direction by a smaller one of the first height or the second height,
wherein the first moving cam and the second moving cam are movable in the axial direction by a sum of a smaller one of the third height or the fourth height and a smaller one of the first height or the second height, and
wherein the first elastic member and the second elastic member are configured to be compressed or uncompressed by distances that the first moving cam and the second moving cam move in the axial direction, respectively.

15. The electronic device of claim 1, wherein at least one of a protruding portion of the first arm cam or a protruding portion of the first cam of the cam member includes an inclined surface obliquely formed in a direction in which the first elastic member is further compressed, such that the hinge structure is unfolded in a state in which the protruding portion of the first arm cam and the protruding portion of the first cam make contact with each other,
wherein at least one of a protruding portion of the first moving cam or a protruding portion of the second cam of the cam member includes an inclined surface obliquely formed in a direction in which the first elastic member is further compressed, such that the hinge structure is unfolded in a state in which the protruding portion of the first moving cam and the protruding portion of the second cam make contact with each other,
wherein at least one of a protruding portion of the second arm cam or a protruding portion of the third cam of the cam member includes an inclined surface obliquely formed in a direction in which the second elastic member is further compressed, such that the hinge structure is unfolded in a state in which the protruding portion of the second arm cam and the protruding portion of the third cam make contact with each other, and
wherein at least one of a protruding portion of the second moving cam or a protruding portion of the fourth cam of the cam member includes an inclined surface obliquely formed in a direction in which the second elastic member is further compressed, such that the hinge structure is unfolded in a state in which the protruding portion of the second moving cam and the protruding portion of the fourth cam make contact with each other.

* * * * *